(12) United States Patent
Rabbi et al.

(10) Patent No.: US 11,059,599 B2
(45) Date of Patent: Jul. 13, 2021

(54) ELECTRIC AIRCRAFT PROPULSION SYSTEM

(71) Applicant: Duxion Motors Inc., St. John's (CA)

(72) Inventors: Sheikh Fazle Rabbi, St. John's (CA); Rick Ralph Pilgrim, Grand Falls-Windsor (CA); Kyle Reuben Genge, Pasadena (CA); Trevor Forward, Calgary (CA); Adam Keating, Mount Pearl (CA); Richard Robert Roper, Katy, TX (US)

(73) Assignee: Duxion Motors, Inc., St. John's (CA)

( * ) Notice: Subject to any disclaimer, the term of this patent is extended or adjusted under 35 U.S.C. 154(b) by 0 days.

(21) Appl. No.: 16/989,117

(22) Filed: Aug. 10, 2020

(65) Prior Publication Data

US 2021/0107664 A1 Apr. 15, 2021

Related U.S. Application Data

(63) Continuation of application No. PCT/CA2020/050662, filed on May 15, 2020.
(Continued)

(51) Int. Cl.
*B64D 27/24* (2006.01)
*B64C 11/00* (2006.01)
(Continued)

(52) U.S. Cl.
CPC ............ *B64D 27/24* (2013.01); *B64C 11/001* (2013.01); *H02K 9/06* (2013.01); *B64C 7/02* (2013.01)

(58) Field of Classification Search
CPC ......... B64D 27/24; B64C 11/001; B64C 7/02; H02K 9/06
See application file for complete search history.

(56) References Cited

U.S. PATENT DOCUMENTS

| | | | |
|---|---|---|---|
| 3,589,617 A | 6/1971 | Adamson | |
| 4,661,734 A * | 4/1987 | Capuano | H02K 11/25 310/89 |

(Continued)

FOREIGN PATENT DOCUMENTS

| | | |
|---|---|---|
| WO | 2007084004 A1 | 7/2007 |
| WO | 2018193149 A1 | 10/2018 |

OTHER PUBLICATIONS

Barrans et al., "Mechanical Design of Rotors with Surface Mounted Permanent Magnets", 2018, IntechOpen, Chapter 5, pp. 87-106 (Year: 2018).*

(Continued)

*Primary Examiner* — Valentina Xavier
(74) *Attorney, Agent, or Firm* — Flether Yoder, P.C.

(57) ABSTRACT

An electric propulsion system for an aircraft includes a nacelle and an electric machine. The electric machine includes a stator positioned in the nacelle, and a rotor and fan assembly positioned in a primary flow path through the nacelle. The rotor and fan assembly includes a cylindrical fan shroud, a plurality of rotor magnets positioned on an outer surface of the fan shroud, and a fan hub mounted on a central support shaft via one or more bearings. A plurality of fan blades extend between an inner surface of the fan shroud and an outer surface of the fan hub. The rotor magnets may be loaded in compression in a radial direction when the rotor and fan assembly is at rest. The fan blades may be pre-stressed in a radial direction when the rotor and fan assembly is at rest.

30 Claims, 32 Drawing Sheets

Related U.S. Application Data

(60) Provisional application No. 62/848,897, filed on May 16, 2019.

(51) Int. Cl.
  *H02K 9/06* (2006.01)
  *B64C 7/02* (2006.01)

(56) References Cited

U.S. PATENT DOCUMENTS

| | | | |
|---|---|---|---|
| 6,837,757 B2 | 1/2005 | Van Dine et al. | |
| 10,177,631 B1* | 1/2019 | Hopkins | H02K 15/105 |
| 10,418,868 B1* | 9/2019 | Long | H02K 15/00 |
| 2009/0267546 A1* | 10/2009 | Maekawa | H02P 21/14 |
| | | | 318/400.02 |
| 2012/0093668 A1* | 4/2012 | Gieras | B63H 23/24 |
| | | | 417/420 |
| 2014/0125166 A1* | 5/2014 | Miyazaki | H02K 9/04 |
| | | | 310/58 |
| 2014/0271284 A1* | 9/2014 | Gray | F16C 33/664 |
| | | | 417/423.1 |
| 2015/0345501 A1* | 12/2015 | Uskert | H02K 29/00 |
| | | | 417/420 |
| 2017/0141654 A1* | 5/2017 | Bodla | H02K 9/20 |
| 2018/0287437 A1* | 10/2018 | Haran | H02K 1/185 |
| 2019/0273421 A1* | 9/2019 | Velderman | H02K 7/083 |
| 2020/0031446 A1 | 1/2020 | Suzuki et al. | |
| 2021/0006128 A1* | 1/2021 | Eason | H02K 5/15 |

OTHER PUBLICATIONS

Baudart et al., "Optimizing the control of permanent magnet polyphase segment synchronous motors in fault tolerant actuation systems", 2012, International Symposium on Power Electronics, Electrical Drives, Automation, and Motion, pp. 30-37 (Year: 2012).*

International Search Report and Written Opinion dated Aug. 17, 2020 in International Patent Application No. PCT/CA2020/050662 (11 pages).

* cited by examiner

ELECTRIC AIRCRAFT PROPULSION SYSTEM

CROSS-REFERENCE TO RELATED APPLICATIONS

This application is a Continuation of International Application No. PCT/CA2020/050662, filed on May 15, 2020, which claims the benefit of U.S. Provisional Application No. 62/848,897, filed on May 16, 2019, the disclosures of which are incorporated herein by reference.

FIELD

This disclosure relates generally to propulsion systems for aircraft, and more specifically to direct drive electric ducted fan propulsion systems for aircraft.

INTRODUCTION

A conventional propulsion system for aircraft includes a motor that transmits torque through a rotating shaft to drive a propulsion fan to propel the aircraft. The rotating shaft is typically housed inside of or directly coupled to the motor.

In the case of ducted fan propulsion systems, the motor is typically located inside the duct and coaxial with the fan (e.g. downstream of the fan). The fan blades are attached to a central hub connected to a motor shaft that drives the fan. To achieve a higher thrust, a motor with a higher power rating may be used. However, motors with higher power ratings tend to have larger outer diameters, which reduce propulsion efficiency when the motor is located inside the duct. For example, a larger motor diameter may exceed an optimum hub/tip ratio of the fan for a fixed nacelle diameter.

To compensate for efficiency losses due to the motor being located downstream of the fan blades, the length of the fan blades may be increased to generate the necessary level of thrust. However, a larger motor and larger fan blades may significantly increase the weight of the propulsion system. Further, as the size and weight of the propulsion system increases, the thrust-to-weight ratio for the system typically goes down. Also, such a system may suffer from significantly increased vibrations, which may necessitate more frequent maintenance, increase vulnerability to mechanical failure, and/or generates higher levels of audible noise.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In the electric aircraft propulsion system disclosed herein, ducted fan blades are integrated into an electric machine. Generally speaking, rotating fan blades form part of the rotor assembly of the electric machine. By removing the requirement for a driven motor shaft, electric propulsion systems disclosed herein allow primary air flow through the electric machine. This may provide increased propulsion efficiency.

Also, the topology of electric propulsion systems disclosed in may allow the electric machine to have a relatively high aspect ratio between its diameter and axial length. This may allow the electric machine to accommodate a set of polyphase multi-polar stator windings. Additionally, or alternatively, the high aspect ratio may enable the electric machine to be scalable to provide higher output power without reaching magnetic saturation in the yoke or in the teeth of the stator. Additionally, or alternatively, the high aspect ratio may reduce the weight and/or rotary inertia of the rotor assembly.

In systems disclosed herein, propulsion fan blades are secured to both an inner hub and an outer shroud, with the hub, fan blades, and shroud forming part of a rotor and fan assembly for the electric machine. In order to compensate for at least a portion of expected centrifugal forces and/or hoop stresses during high speed operation, at least some components of the rotor and fan assembly are preferably pre-loaded (e.g. in a radial direction) during their manufacture and/or assembly, such that at least some components are under compression when the rotor and fan assembly is at rest. For example, rotor magnets positioned on an outer surface of the shroud, the shroud, and/or the fan blades may be pre-loaded in compression. By pre-loading components of the rotor and fan assembly, a portion of the centrifugal forces generated during rotation of the rotor and fan assembly may be effectively 'offset' by relieving the pre-compressive stress, resulting in less net tensile stress on the rotor and fan assembly during high-speed operation.

In accordance with one broad aspect of this disclosure, there is provided an electric propulsion system for an aircraft, the system comprising: a nacelle defining a primary air flow path from an inlet end of the nacelle to an outlet end of the nacelle; an electric machine comprising: a stator positioned in the nacelle and comprising one or more stator windings; and a rotor and fan assembly positioned in the primary flow path, the rotor and fan assembly comprising: a cylindrical fan shroud having a first end, a second end, an inner surface, and an outer surface; a plurality of rotor magnets positioned on the outer surface of the fan shroud and concentric with the one or more stator windings; a fan hub positioned concentrically interior of the fan shroud, the fan hub having a first end, a second end, an inner surface, an outer surface, and a fan axis of rotation, the fan hub being mounted on a central support shaft via one or more bearings; and a plurality of fan blades extending between the inner surface of the fan shroud and the outer surface of the fan hub.

In some embodiments, the plurality of rotor magnets are pre-stressed in a radial direction when the rotor and fan assembly is at rest.

In some embodiments, the rotor and fan assembly further comprises a sleeve for securing the plurality of rotor magnets to the cylindrical fan shroud.

In some embodiments, the sleeve is a compression sleeve that applies a compressive load to the plurality of rotor magnets.

In some embodiments, an outer end of each fan blade is secured directly to the inner surface of the fan shroud.

In some embodiments, the outer end of each fan blade is secured to the inner surface of the fan shroud via a dovetail joint.

In some embodiments, the plurality of fan blades are loaded in compression in a radial direction when the rotor and fan assembly is at rest.

In some embodiments, an inner end of each fan blade has a fan blade base, and further comprising at least one nut positioned between each fan blade base and the fan hub, wherein the at least one nut applies a compressive load in the radial direction to that fan blade.

In some embodiments, each fan blade base has a projecting feature on one side of the fan blade base and a complementary recess on an opposite side of the fan blade base for receiving the projecting feature of an adjacent fan blade base.

In some embodiments, the plurality of rotor magnets are positioned in a Halbach configuration.

In some embodiments, the one or more stator windings comprise polyphase fault tolerant windings.

In some embodiments, the polyphase windings comprise at least three phases.

In some embodiments, the system further comprises a plurality of guide vanes positioned in the primary air flow path downstream of the electric machine to promote redirection of circumferential air flow resulting from rotation of the rotor and fan assembly relative to the nacelle towards axial air flow.

In some embodiments, the plurality of guide vanes provide structural support for the central support shaft.

In some embodiments, the stator has an inner stator diameter and an axial stator length, and wherein the inner stator diameter is at least 4 times, at least 20 times greater, or at least 20 times greater than the axial stator length.

In some embodiments, the stator has an inner diameter, and further comprising a stator enclosure for housing the stator, the stator enclosure comprising: an annular casing positioned concentrically around the stator, the annular casing having a first end, a second end, an inner surface, and an outer surface, a casing diameter; a front stator face plate coupled to the first end of the annular casing, the front stator face plate having an inner diameter generally aligned with the inner diameter of the stator; and a rear stator face plate coupled to the second end of the annular casing, the rear stator face plate having an inner diameter generally aligned with the inner diameter of the stator.

In some embodiments, power electronics for the one or more stator windings are coupled to the annular casing.

In some embodiments, the annular casing and at least one of the front stator face plate and the rear stator face plate are integrally formed.

In some embodiments, a plurality of cooling fins are provided on a front surface of the front stator face plate.

In some embodiments, the system further comprises a plurality of condensers positioned around the stator enclosure.

In some embodiments, the system further comprises a plurality of air flow ducts, each of the air flow ducts positioned to direct air into an upstream end of one of the plurality of condensers.

In some embodiments, the system further comprises heat pipes in thermal communication with the plurality of condensers and with at least one of the one or more stator windings.

In some embodiments, the rotor and fan assembly further comprises a rotor cooling system.

In some embodiments, the rotor cooling system comprises at least one rotor heat pipe in thermal communication with each of the plurality of rotor magnets, each rotor heat pipe being configured to promote oscillatory motion of fluid within that rotor heat pipe in response to a temperature difference between that rotor magnet and ambient air.

In some embodiments, wherein the cylindrical fan shroud has an axial shroud length, the plurality of fan blades has an axial blade length, and wherein the axial shroud length no more than 105% of the axial blade length.

In some embodiments, the rotor and fan assembly further comprises a nose cone coupled to the first end of the fan hub.

In some embodiments, the system further comprises a hub fairing positioned downstream of the rotor and fan assembly.

In some embodiments, the system further comprises a linear actuator coupled to the hub fairing, wherein the hub fairing may be selectively moved between an extended position in which at least a portion of the hub fairing is positioned in an exit nozzle of the nacelle, and a retracted position in which the hub fairing is proximate the fan hub.

In accordance with another broad aspect of this disclosure, there is provided an aircraft comprising an electric propulsion system as disclosed herein.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
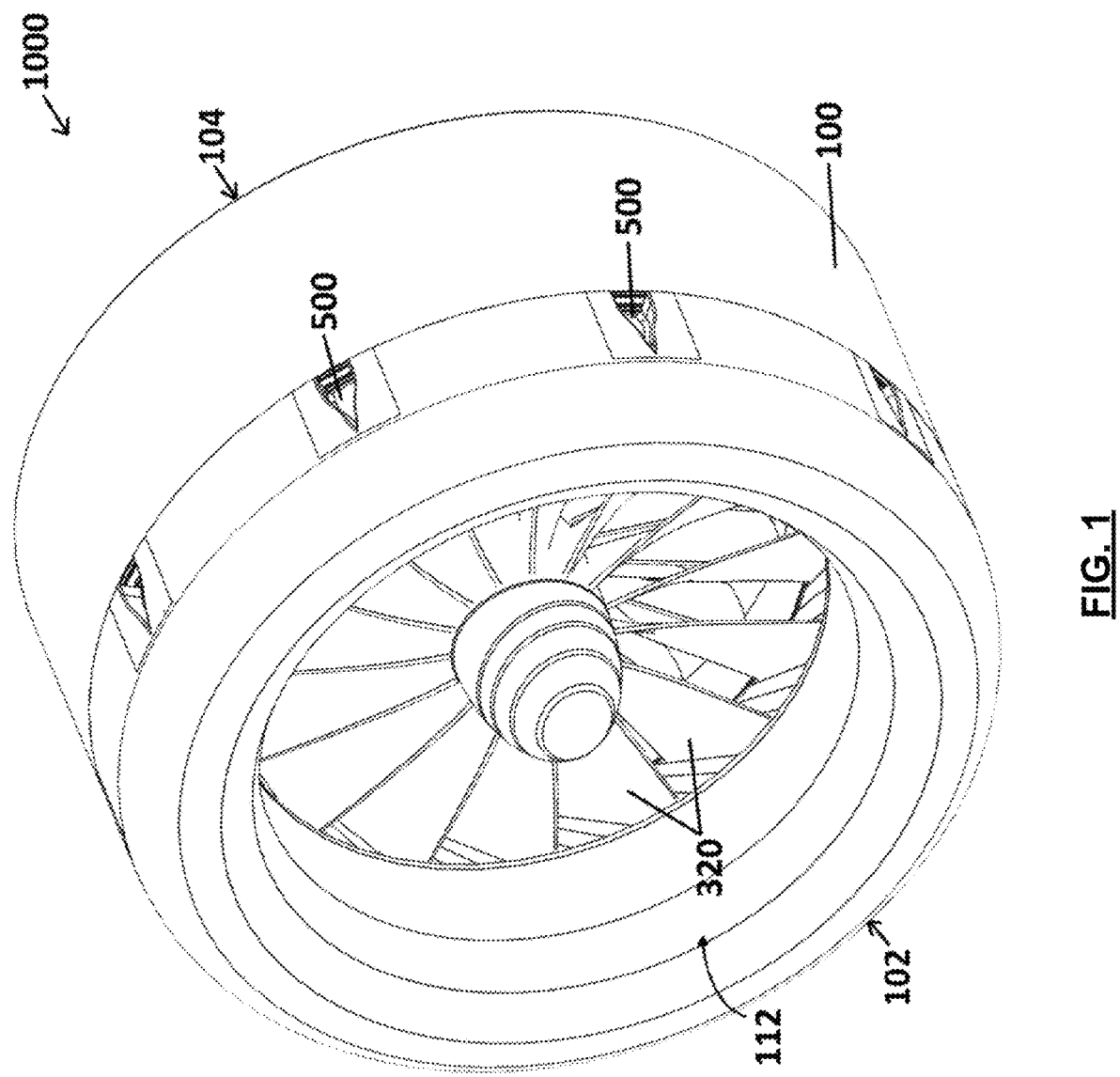
FIG. 1 is a perspective view of an electric propulsion system for an aircraft, in accordance with one embodiment.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

While the apparatus and methods disclosed herein are described specifically in relation to and in use with fixed wing aircraft, it will be appreciated that the apparatus and methods may alternatively be used with other types of aircraft, and/or other types of vehicles (e.g. hovercrafts, helicopters, hyperloop pods). It will also be appreciated that the apparatus and methods may be used to provide non-primary thrust (e.g. as a helicopter tail rotor, in vertical take-off and landing (VTOL) applications, and/or emergency braking for non-VTOL aircraft, e.g. similar to auto-rotation in helicopters). It will also be appreciated that the apparatus and methods may alternatively be used in other applications (e.g. axial compressors, ventilation fans)

Figure 2:
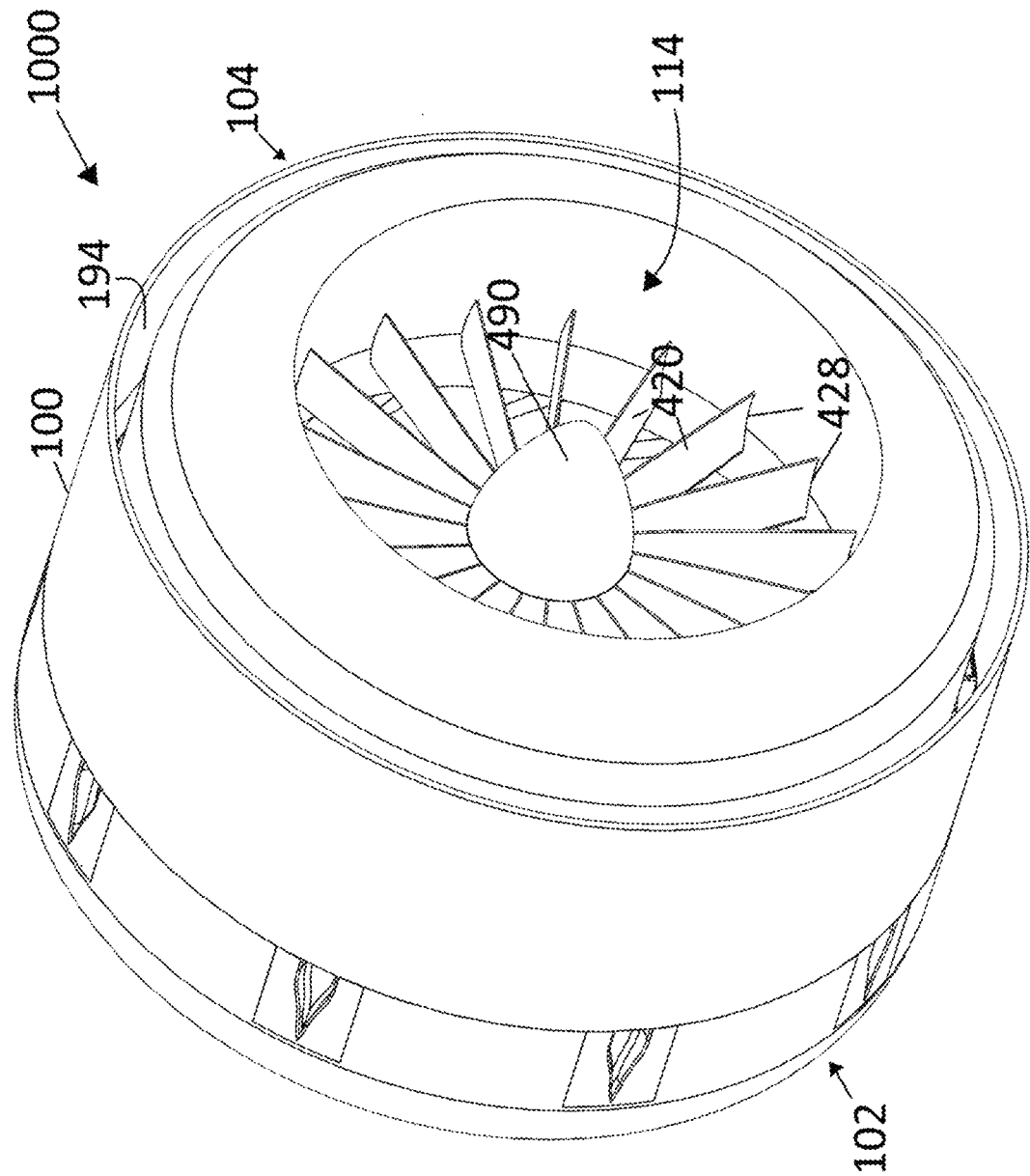
FIG. 2 is another perspective view of the electric propulsion system of FIG. 1.

FIGS. 1 to 5 illustrate an example embodiment of an electric propulsion system for an aircraft, referred to generally as 1000. With reference to FIGS. 1 and 2, electric propulsion system 1000 includes an electric machine positioned in a nacelle 100. The electric machine includes a stator mounted to the nacelle and a rotor and fan assembly that can be driven by the stator. Electrical power may be supplied to one or more stator windings to induce rotation of the rotor and fan assembly. When rotated, fan blades in the rotor and fan assembly promote air flow through the nacelle, thereby creating mechanical thrust. Accordingly, electric propulsion system 1000 may be characterized as a ducted axial fan propulsion system. Also, as the torque is applied to the rotor and fan assembly from a stator positioned around the fan blades, electric propulsion system 1000 may additionally or alternatively be characterized as a rim-driven propulsion system.

Nacelle 100 provides an aerodynamic enclosure for the electric machine. For example, nacelle 100 may act as a flight surface to reduce aerodynamic drag. In the illustrated example, nacelle 100 includes optional cooling ducts 500 to assist in dissipating heat from the stator by directing airflow over a stator enclosure (discussed further below). For example, inlet air may be directed through one or more cooling ducts 500 located at the front end 102 of nacelle 100, and outlet air may be expelled at an outlet 194 located near the rear end 104 of the nacelle 100.

Some or all of nacelle 100 may be formed from composite materials, such as fiber-reinforced thermoplastics. The use of such materials may result in a reduced nacelle weight and/or increased structural performance for nacelle 100.

Figure 3:
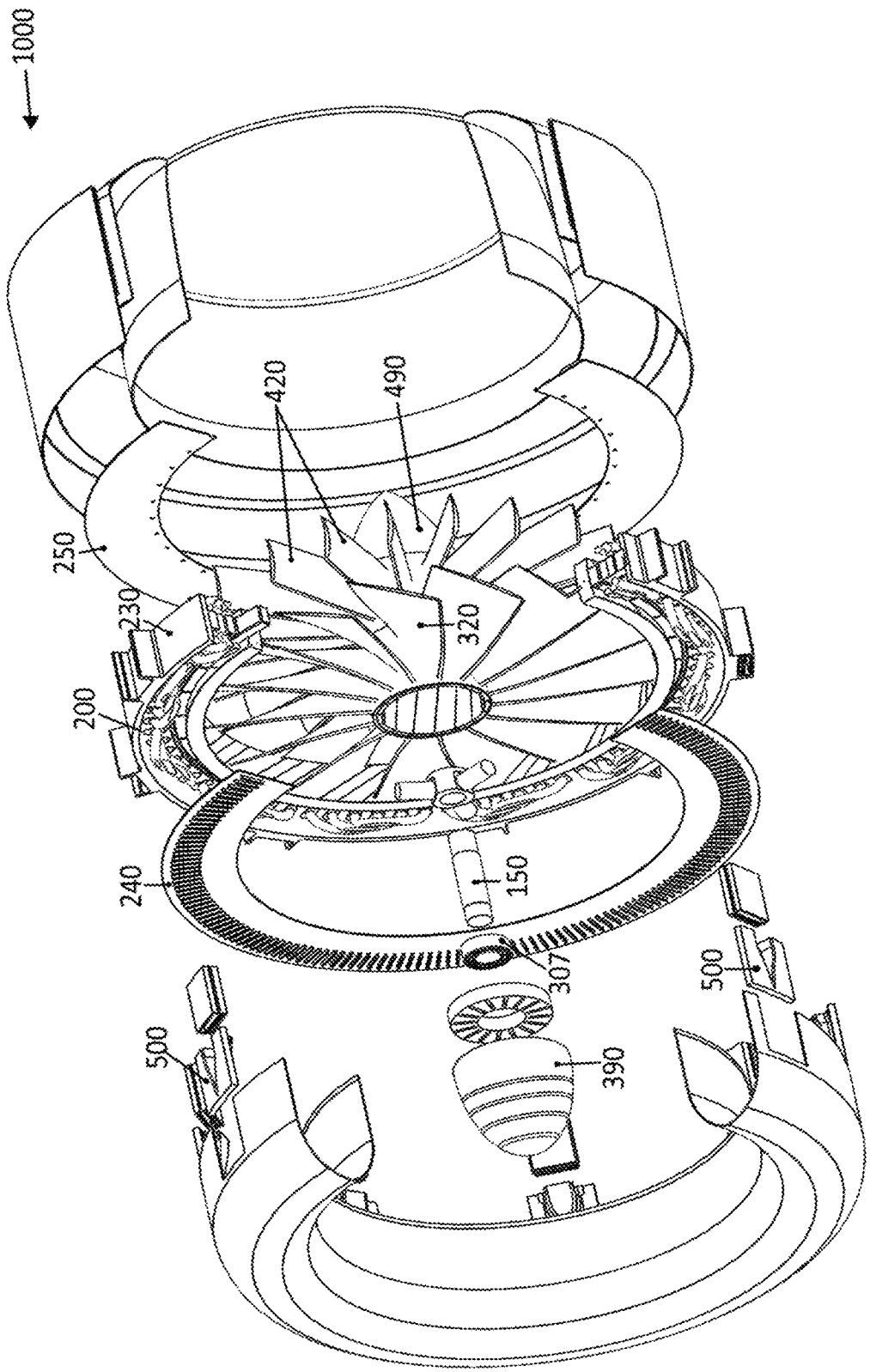
FIG. 3 is a partially exploded, partial section view of the electric propulsion system of FIG. 1.
Figure 4:
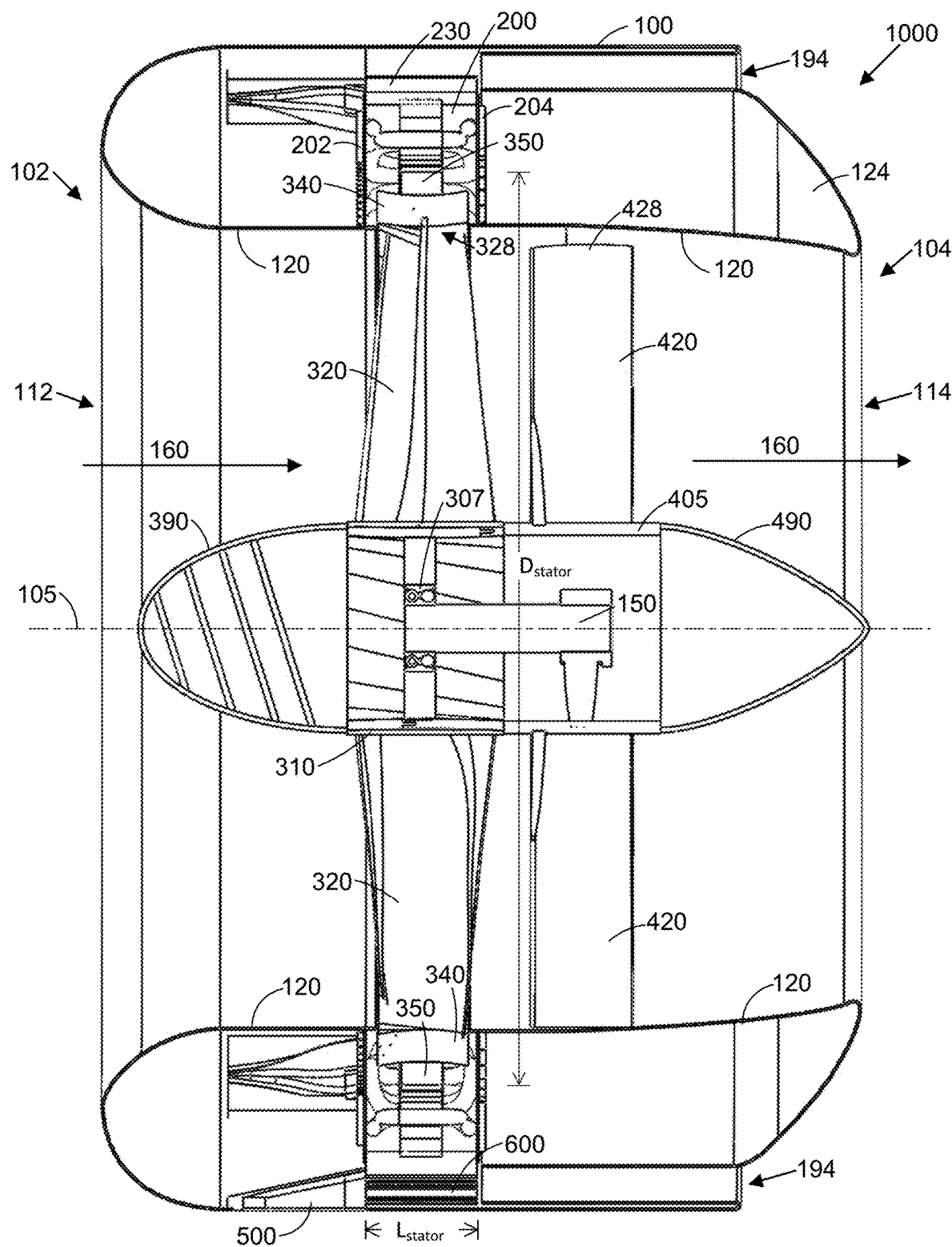
FIG. 4 is a cross section view of the electric propulsion system of FIG. 1.
Figure 5:
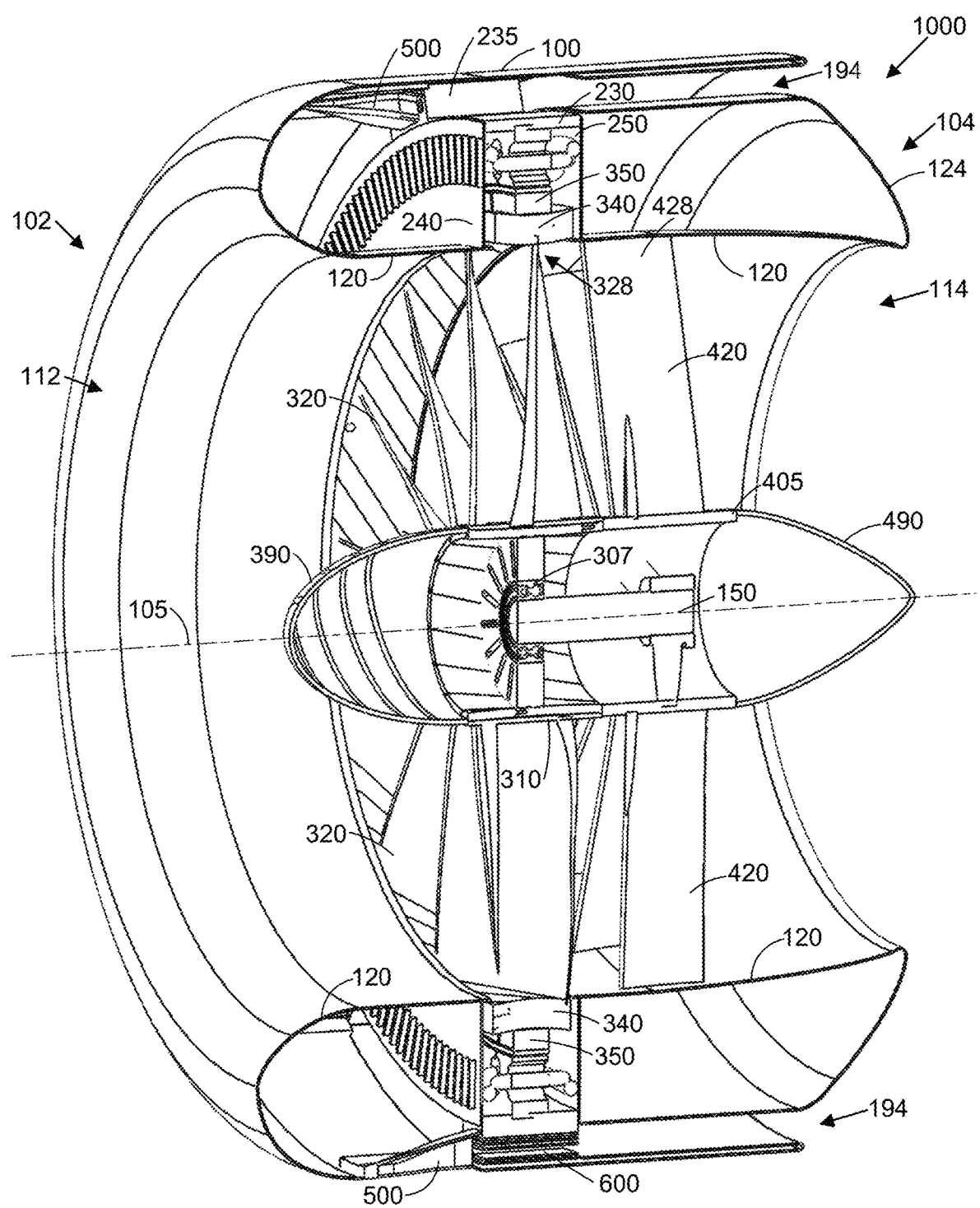
FIG. 5 is a perspective section view of the electric propulsion system of FIG. 1.
Figure 6:
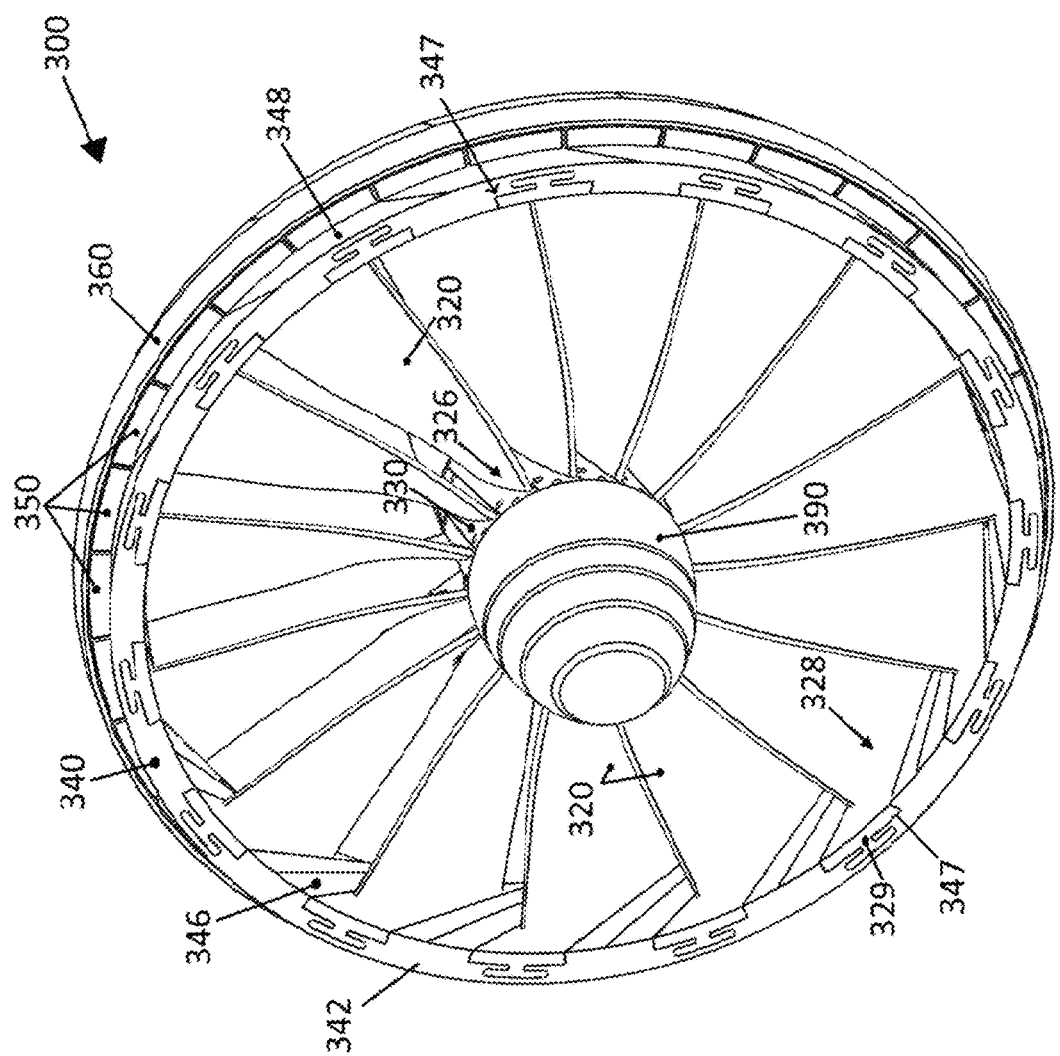
FIG. 6 is a perspective view of a rotating fan assembly of the electric propulsion system of FIG. 1.

With reference to FIGS. 3 to 5, electric propulsion system 1000 includes a stator, referred to generally as 200, that surrounds a primary air flow path 160 that extends through the nacelle 100 from a primary air inlet 112 to a primary air outlet 114. The inner contours 120 of nacelle 100 that define air flow path 160 may be configured to support the production of mechanical thrust. For example, an aft section 124 of nacelle 100 (which may be characterized as exit nozzle 124) provided adjacent outlet 114 may act as a diffuser nozzle for air flow exiting the cooling system to assist mixing with air flow exiting the primary air flow path 160.

Positioned interior of stator 200 is a rotor and fan assembly, referred to generally as 300, configured to be rotated by the stator 200 about an axis 105. A hub 310 (which may be referred to as fan hub 310) of the rotor and fan assembly 300 is mounted on a central support shaft 150 via one or more bearings 307. In the illustrated example, central support shaft 150 extends from a central hub 405 of a non-rotating guide vane assembly 400 positioned downstream of the electric machine rotor and fan assembly 300.

Guide vane assembly 400 includes a plurality of aerodynamic guide vanes 420 that extend from hub 405 to the nacelle 100. Preferably, guide vanes 420 provide structural support to central hub 405, thereby providing structural support to central support shaft 150. Put another way, guide vane assembly 400 acts as a support for the shaft and bearing system about which the rotor and fan assembly 300 rotates.

Guide vanes 420 are preferably configured to promote redirection of circumferential air flow resulting from rotation of the rotor and fan assembly relative to the nacelle towards axial air flow. For example, guide vanes 420 may be configured to regain some of the swirl losses imparted by the rotating rotor and fan assembly 300 and straighten the air flow to reduce motor load torque as well as increase overall propulsive efficiency. Additionally, or alternatively, the sweep angle of guide vanes 420 may be configured such that the exit gas angle of the rotor and fan assembly 300 aligns with the inlet angle of the guide vanes 420, thereby turning the flow across the vane chords until it aligns with the axial direction of the rotor and fan assembly 300. Additionally, or alternatively, radially outer ends 428 of guide vanes 420 may be integrated into nacelle 100 to correct the circumferential flow created downstream of the ducted fan into axial flow.

Guide vanes 420 may be made of any suitable material, such as carbon fiber reinforced composites. It will be appreciated that composite guide vanes may include one or more mechanical additives, e.g. to increase stiffness of the guide vanes, and/or to provide additional structural support to central support shaft 150.

For the one or more bearings 307, it will be appreciated that different bearing topologies may be employed. For example, double angular contact ball bearings may be used to provide low running friction while withstanding high radial, thrust, and/or dynamic loads. Double angular contact ball bearings may also be suitable for high-speed operation as they typically can tolerate misalignment which may reduce bearing stresses imparted by the rotor. Double angular contact ball bearings may also provide a similar response to loading as a multiple bearing system, which may be considered advantageous. In some examples, pressurized capillary bearings may be used to balance the rotor. In some examples, an active magnetic bearing system may be used to balance the rotor.

Optionally, air may be directed through the hub 310 (e.g. via nose cone 390) to provide passive cooling for the bearings 307.

Figure 7:
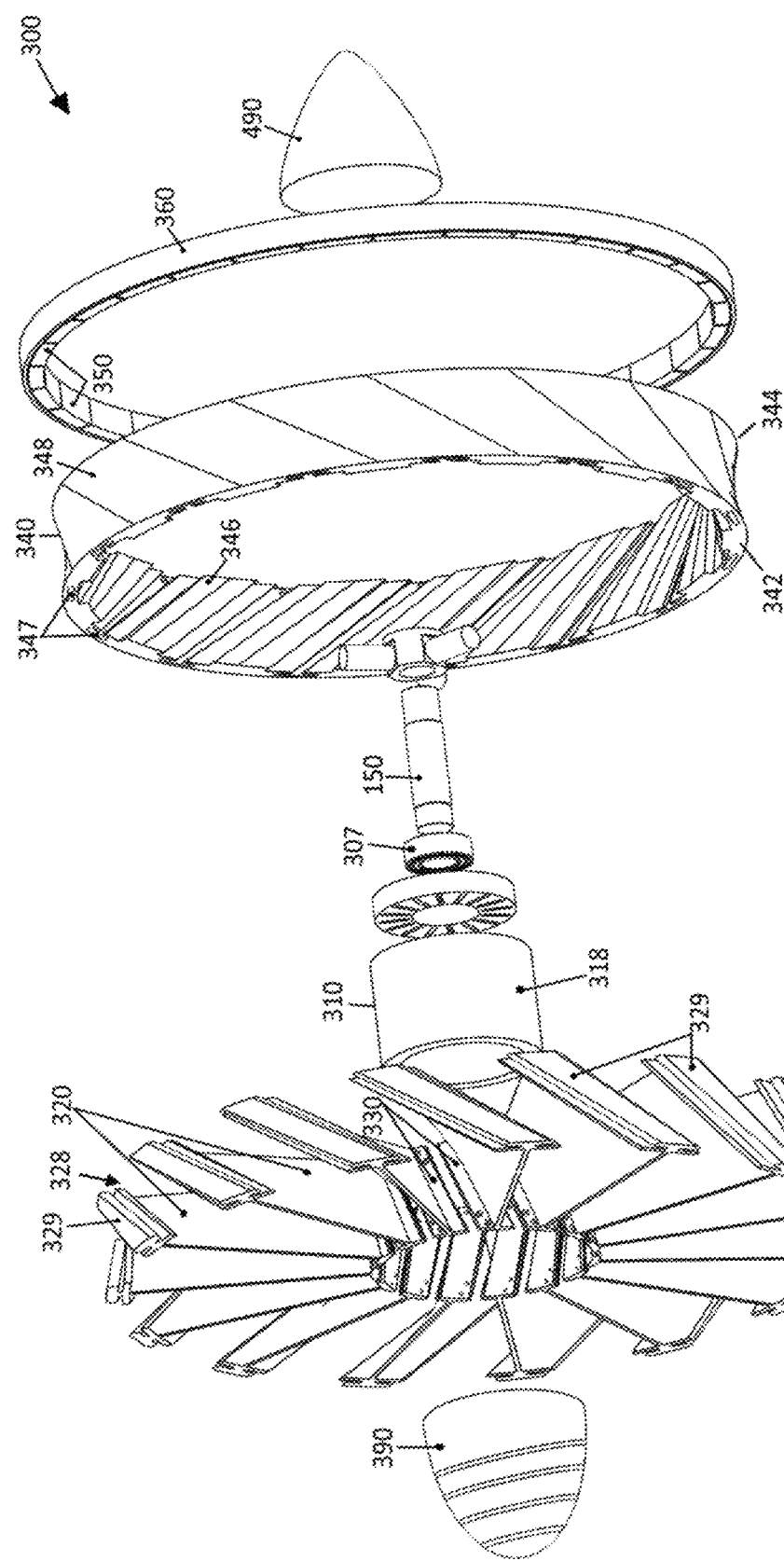
FIG. 7 is a partially exploded perspective view of the rotating fan assembly of FIG. 6.

FIGS. 6 to 8B illustrate an example rotor and fan assembly 300. With reference to FIG. 7, rotor and fan assembly 300 includes a cylindrical fan shroud 340, fan hub 310, and a plurality of fan blades 320 extending between the fan shroud 340 and the fan hub 310.

In the illustrated example, radially outer ends 328 of each fan blade 320 are secured to an inner surface 346 of shroud 340 using a dovetail arrangement, with 'pins' 329 extending from the outer ends 328 of each fan blade 320 being received in a slot or 'tail' 347 of shroud 340. One or more locking pins (not shown) may be provided to inhibit or prevent axial movement of the blades once they have been coupled to the shroud 340.

It will be appreciated that, alternatively, pins 329 and slots 347 may be firtree shaped.

In the illustrated example, a radially inner end 326 of each fan blade 320 has a fan blade base 330. Fan blade bases 330 are secured to an outer surface 318 of hub 310 using one or more mechanical fasteners, such as threaded counterbore bolts 335.

In the illustrated example, each fan blade base 330 has a projecting feature 333 on one side and a complementary recess 337 on an opposite side for receiving the projecting feature 333 of an adjacent fan blade base 330. Such an arrangement may have one or more advantages. For example, projections 133 may act as a slip plane to dimensionally locate fan blades 320 during the installation process. Projections 133 may also provide some structural support between adjacent fan blades, e.g. to distribute shear stresses across rotor and fan assembly 300, thereby reducing the effect of localized stress raisers.

Providing separate fan blades 320 may have one or more advantages. For example, individual fan blades 320 may be removed and/or replaced, e.g. if damaged.

In the illustrated example, rotor and fan assembly 300 includes 15 fan blades 320. It will be appreciated that more or fewer fan blades 320 may be provided in one or more alternative embodiments.

Fan blades 320 may be low-pressure ratio turbomachinery blades for use in subsonic to transonic flow regimes. The swept airfoil profile of the fan blades 320 may be designed to maximize tip speed and pressure ratio of the rotor and fan assembly 300. In such examples, the chord of the fan blades 320 (i.e. the axial length from the leading edge to the trailing edge of each blade) may be sufficiently wide to provide stability and efficiency to the rotor and fan assembly 300. It will be appreciated that there is a tradeoff between blade chord length and blade drag.

Fan blades 320 may be made from any suitable material, such as a carbon fiber reinforced polymer (CFRP) or a metallic alloy (e.g. a titanium or aluminum alloy).

In the illustrated example, rotor and fan assembly 300 includes a nose cone 390. Preferably, nose cone 390 rotates with hub 310 to pre-swirl a portion of incoming air into the electric propulsion system 1000. Also illustrated is an optional hub fairing 490 that does not rotate.

As discussed above, hub 310 is preferably mounted on central support shaft 150 via one or more bearings 307. Preferably, bearings 307 include one or more angular contact bearings to promote rotor concentricity.

Optionally, nose cone 390 may be configured to direct air through the hub 310 to provide passive cooling for bearings 307.

Rotor and fan assembly 300 also includes a plurality of rotor magnets 350 positioned on the outer surface 348 of fan shroud 340. In the illustrated example, magnets 350 are secured using a compressive sleeve 360. Alternatively, rotor magnets 350 may secured to the outer surface of shroud 340, or partially or fully buried inside shroud 340.

Rotor and fan assembly 300 is preferably configured to be rotated at relatively high speeds by stator 200. For example, rotor and fan assembly 300 may have an operating speed of about 7,000 revolutions per minute (RPM), and a maximum speed of about 8,500 RPM. At such speeds, centrifugal forces on fan blades and/or hoop stress on shroud 340 and magnet sleeve 360 may be significant. These forces and stresses may be particularly significant when the electric machine has a relatively high aspect ratio (i.e. a ratio between the rotor diameter and the axial length of the rotor). For example, embodiments of electric propulsion system 1000 may have a rotor tip velocity of about 290 m/s at 7,000 RPM, a rotor tip velocity of about 350 m/s at 8,500.

In order to compensate for at least a portion of the centrifugal force and/or hoop stress, rotor magnets 350 may be loaded in compression in a radial direction when the rotor and fan assembly is at rest. By pre-loading the rotor magnets 350 in compression, the maximum tensile load of the rotor magnets may thereby be increased. This may result in an increased maximum tensile load for the rotor and fan assembly 300, which may increase the maximum rotational speed of the rotor assembly and/or the thrust output of electric propulsion system 1000.

For example, magnets 350 may be neodymium (NdFeB) magnets, which typically have a yield strength of 75-80 MPa. By pre-loading the rotor magnets 350 in compression, a portion of the hoop stresses generated during rotation of the rotor and fan assembly 300 may be directed to relieving compressive forces imparted from sleeve 360 before tensile forces dominate and cause yielding or fracture of rotor magnets 350, resulting in a higher safe operating hoop stress on magnets 350. Put another way, a portion of the centrifugal forces generated during rotation of the rotor and fan assembly 300 may be effectively 'offset' by relieving the pre-compressive stress, resulting in less net tensile stress on the rotor magnets 350.

An effect of a higher maximum operating hoop stress is effectively a higher maximum rotational speed of rotor and fan assembly 300, which may increase the maximum thrust output of electric propulsion system 1000.

Compressive force may be applied to magnets 350 in any suitable manner. For example, pre-compressive stresses may be applied via compressive sleeve 360 during assembly of the rotor and fan assembly 300. Compressive sleeve 360 may be alternatively characterized as an interference fit sleeve. Preferably, compressive sleeve 360 applies a significant compressive force to magnets 350 when the rotor and fan assembly is at rest.

Compressive sleeve 360 may be made from a material having a high specific stiffness (e.g. a carbon fiber reinforced composite, titanium or aluminum alloy, or the like).

Additionally, or alternatively, fan blades 320 may be loaded in compression in a radial direction when the rotor and fan assembly is at rest, in order to provide an outward compressive force on magnets 350. By pre-loading the fan blades 320 in compression, blades 320 and/or shroud 340 may exert a radially outward force on an inner surface of magnets 350, resulting in a compressive load on magnets 350 (as the magnets are retained in position e.g. via compressive sleeve 360).

For example, pre-stressed fan blades 320 may increase the compressive force on rotor magnets 350, which may allow a thinner sleeve 360 to be used. This may be advantageously facilitate a smaller air gap for the electric machine, which may increase the torque/power density of electric propulsion system 1000.

Figure 8A:
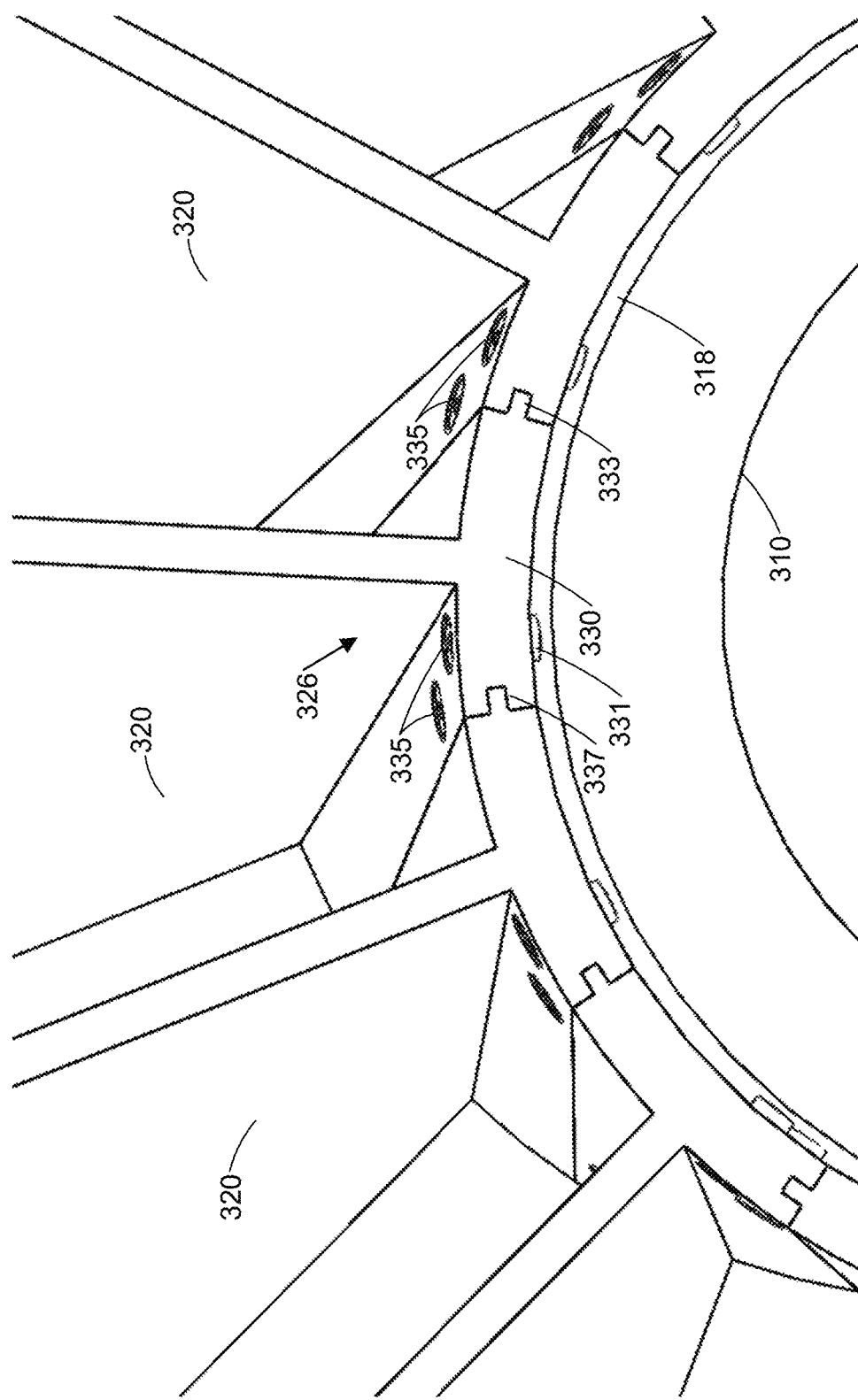
FIG. 8A is a perspective view of connections between fan blades and a central hub of the rotating fan assembly of FIG. 6.
Figure 8B:
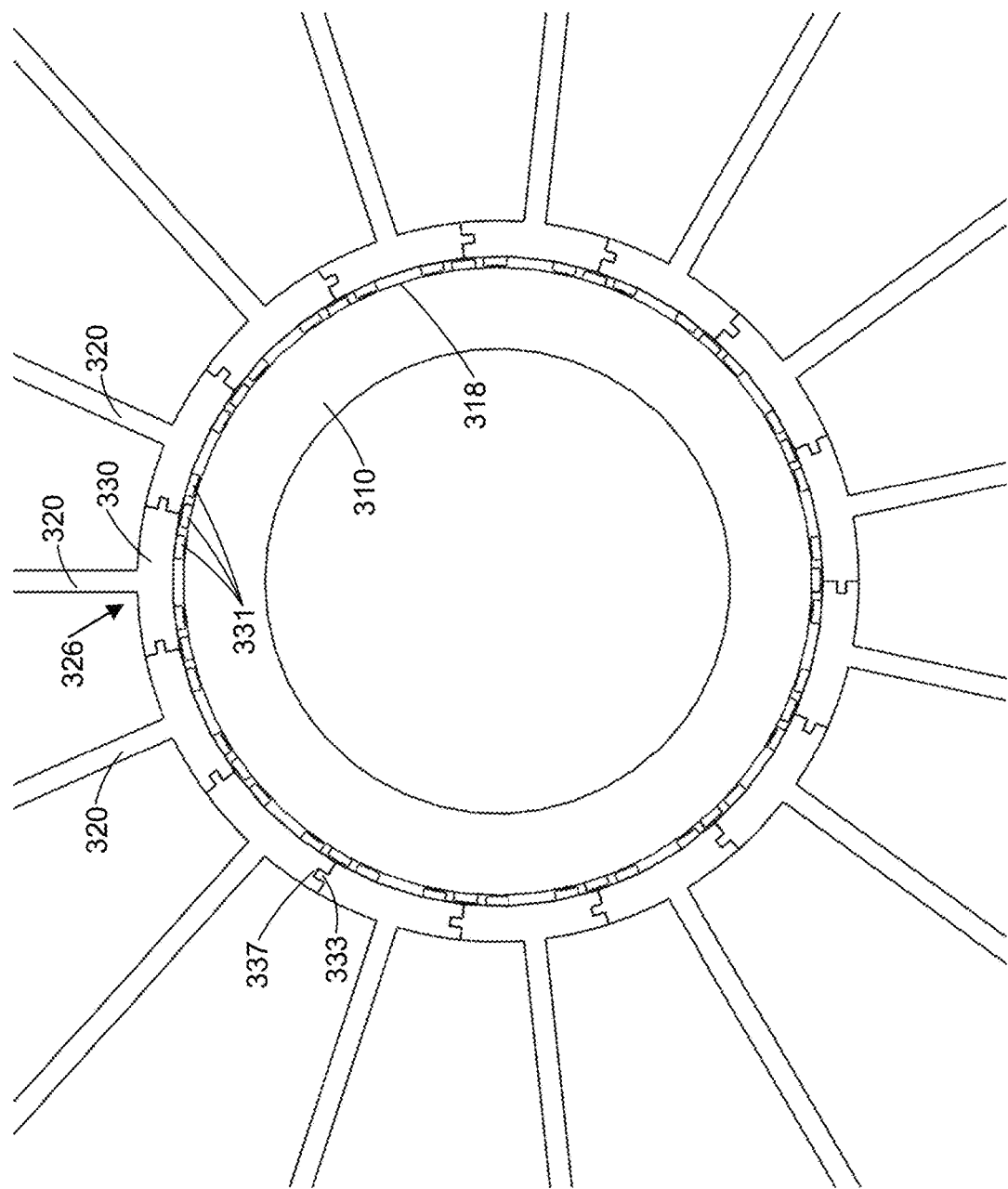
FIG. 8B is an end view of the central hub and fan blades of FIG. 8A.

It will be appreciated that fan blades 320 may be loaded in compression in a radial direction using any suitable method. As illustrated in FIGS. 8A and 8B, one or more nuts 331 may be placed between each fan blade base 330 and the hub 310 to apply a pre-compressive stress on the fan blades. For example, once fasteners 335 have been installed, nuts 331 may be rotated to provide pre-stress on blade 320. Alternatively, nuts 331 may be configured to increase compressive loading as fasteners 335 are tightened (e.g. via a countersunk arrangement).

Figure 32:
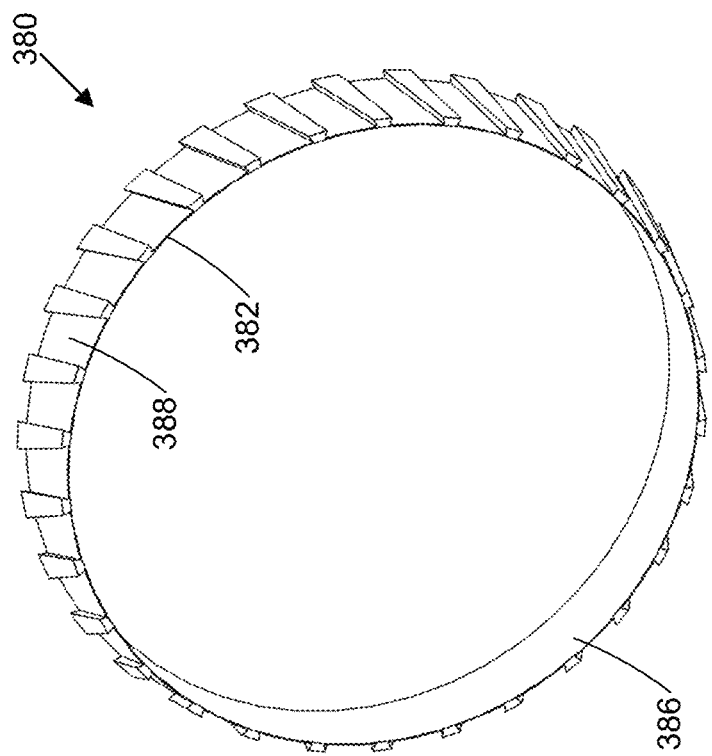
FIG. 32 is a perspective rear end view of the wedge ring of FIG. 31.
Figure 31:
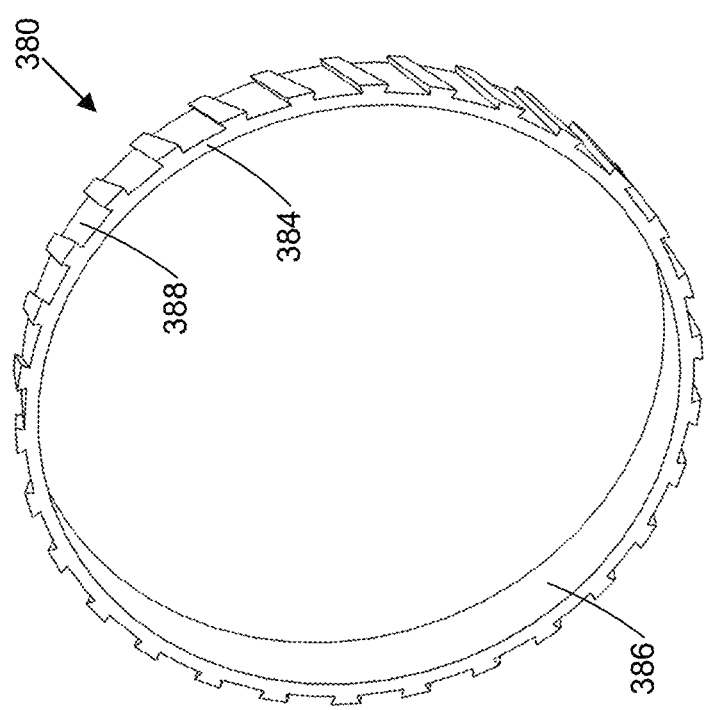
FIG. 31 is a perspective front end view of a wedge ring of the embodiment of FIG. 29.

Alternatively, one or more annular wedges may be positioned between the fan blades and the fan hub to apply a pre-compressive stress on the fan blades. In the example illustrated in FIGS. 29 to 32, a pair of wedge rings 380 are configured to engage fan blade bases 330 using a dovetail arrangement. As perhaps best seen from FIGS. 31 and 32, wedge rings 380 have a generally cylindrical inner surface 386 and a tapered outer surface 388. Accordingly, as wedge rings 380 are inserted between fan blade bases 330 and outer surface 318 of fan hub 310, they may exert a compressive outward force on fan blades 320.

In some embodiments, compressive sleeve 360 may provide a sufficient compressive force to magnets 350, and pre-compression of blades 320 may not be required.

During high speed rotation, the overall von Mises stress (particularly radial stress) in shroud 340 may be high. Thus, shroud 340 is preferably made from a material that has a high specific stiffness value, to inhibit or prevent rotor deformation. As discussed above, radially outer ends 328 of each fan blade 320 may be secured to an inner surface 346 of shroud 340. Coupling fan blades 320 directly to shroud 340 may increase the overall stiffness of rotor and fan assembly 300, which may lead to a larger operating envelope (e.g. higher speed/better safety factor/lower rotor deformation) for electric propulsion system 1000.

In embodiments where pre-compression of blades 320 is not required (e.g. where compressive sleeve 360 provides sufficient compressive force to magnets 350), fan blades 320 may be pre-stressed in tension (e.g. pulling shroud 340 radially towards hub 310) or in compression (e.g. pushing shroud 340 radially away from hub 310) to further reduce deformation of rotor and fan assembly 300. For example, nuts 331 may not be provided, and tightening fasteners 335 may pre-stress blades 320.

In the illustrated example, outer surface 348 and inner surface 346 have approximately the same profile. Put another way, shroud 340 has a substantially constant radial thickness. It will be appreciated that outer surface 348 and inner surface 346 may have different profiles in one or more alternative embodiments.

Providing electric propulsion system 1000 with a rotor and fan assembly 300 as described herein may have one or more advantages. For example, since each fan blade 320 is secured to both an inner hub 310 and an outer shroud 340, each fan blade may have sufficient stiffness and/or sufficient reliability under dynamic loading to facilitate electric propulsion system 1000 being used as part of an airframe mounted Boundary Layer Ingestion (BLI) system that deals with significant inlet airflow distortion.

As another example, since each fan blade is connected to shroud 340, there is no gap between tips of the fan blades and the structure defining the primary airflow path through nacelle 100, which may result in decreased audible noise when compared to typical shaft-driven ducted fan propulsion systems.

Figure 9:
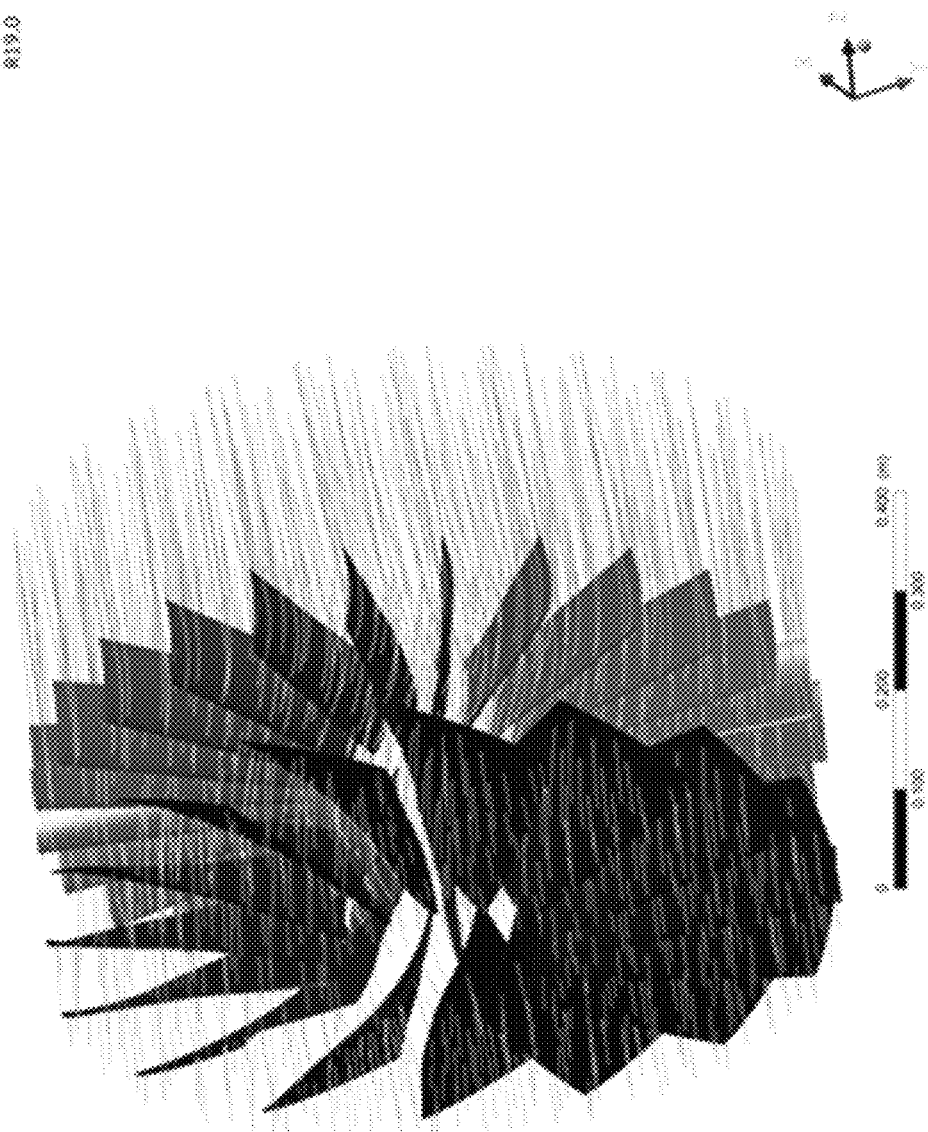
FIG. 9 is a model of airflow behavior for an rotating fan and static guide vane assembly of an electric propulsion system for an aircraft.

FIG. 9 shows output from a model of fan blades 320, guide vanes 420, and a primary airflow path taken through the electric propulsion system 1000. Streamlines 90 indicate air being swirled by the rotating fan blades 320 and realigned in the axial direction by the downstream guide vanes 420.

Simulations were conducted in which transient rotor-guide vane interactions were resolved to predict flow behavior inside the nacelle 100. Modeling suggests that guide vanes 420 (which may be collectively characterized as a stationary blade row) act to straighten the exit airflow, and thus regain at least some of the kinetic energy lost to rotational velocity as thrust.

Preliminary modeling and data extrapolation from similar systems predict comparable thrust performance to shaft driven turbofans. For example, electric propulsion system 1000 may provide about 80% or more thrust compared to a shaft driven turbofan of a similar power output, due to a relatively high bypass flow.

Figure 10:
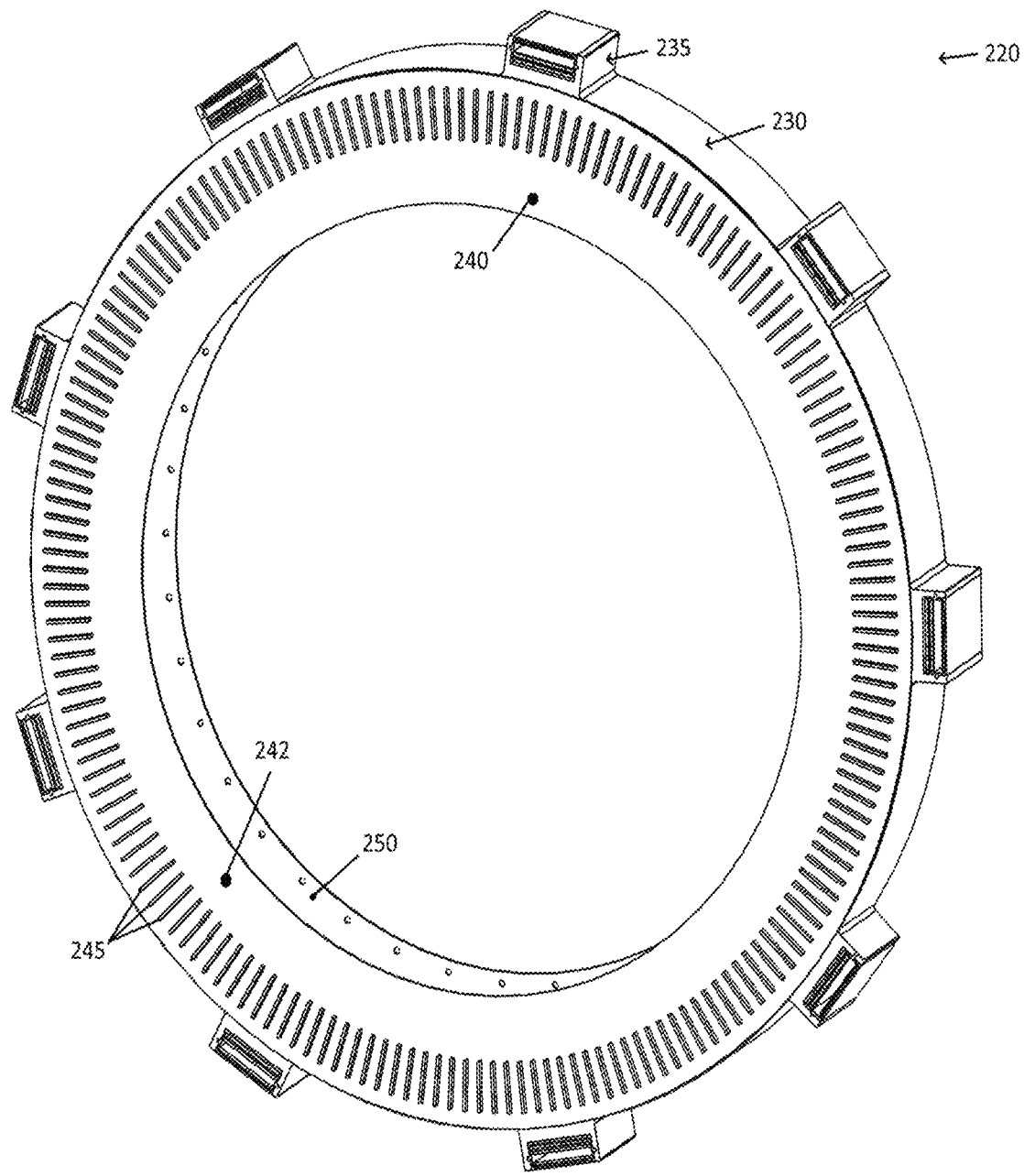
FIG. 10 is a perspective view of a stator enclosure of the electric propulsion system of FIG. 1.
Figure 11:
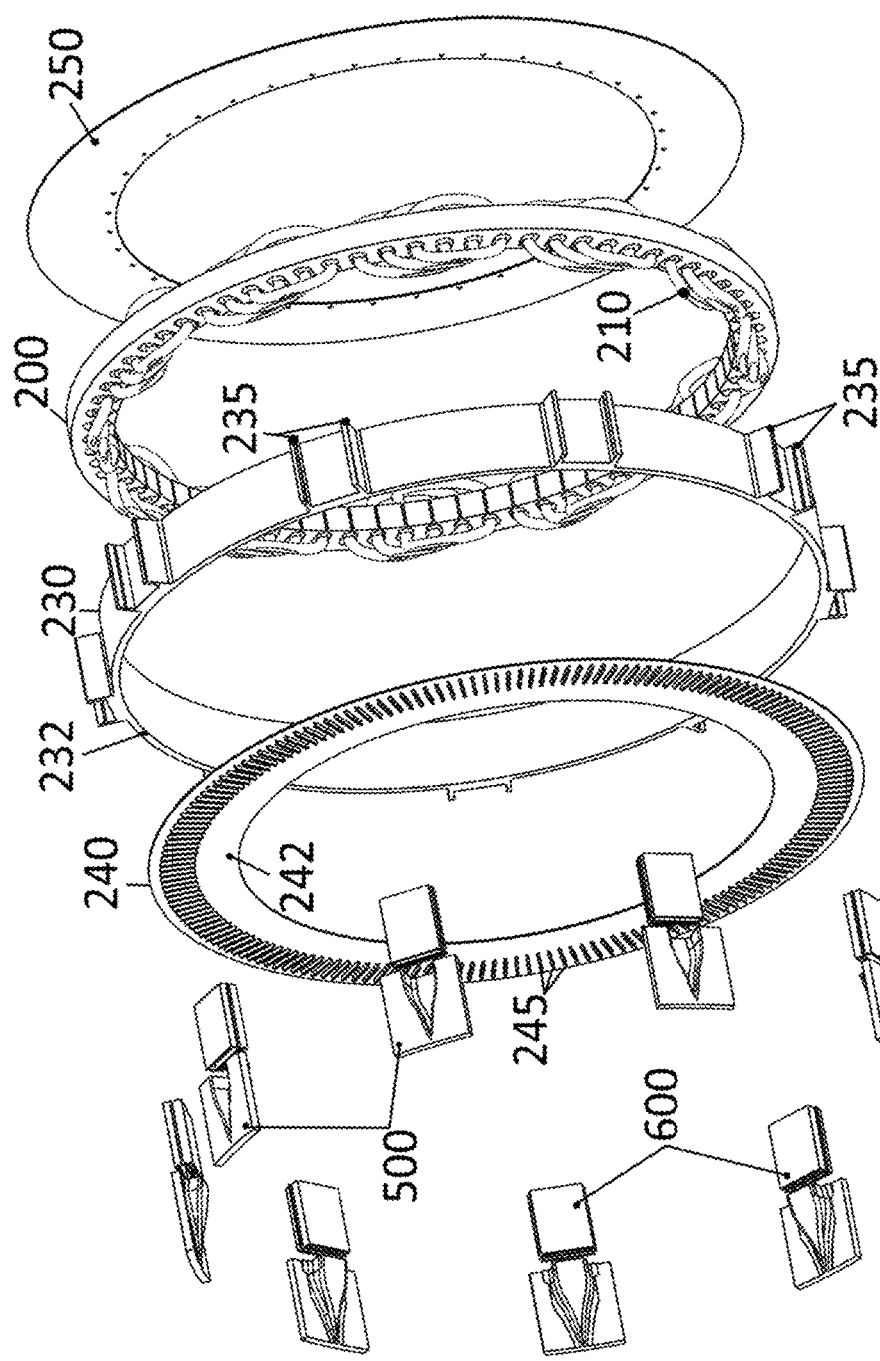
FIG. 11 is a partially exploded perspective view of the stator enclosure of FIG. 10, along with recessed ducts to direct airflow across condensers.
Figure 12:
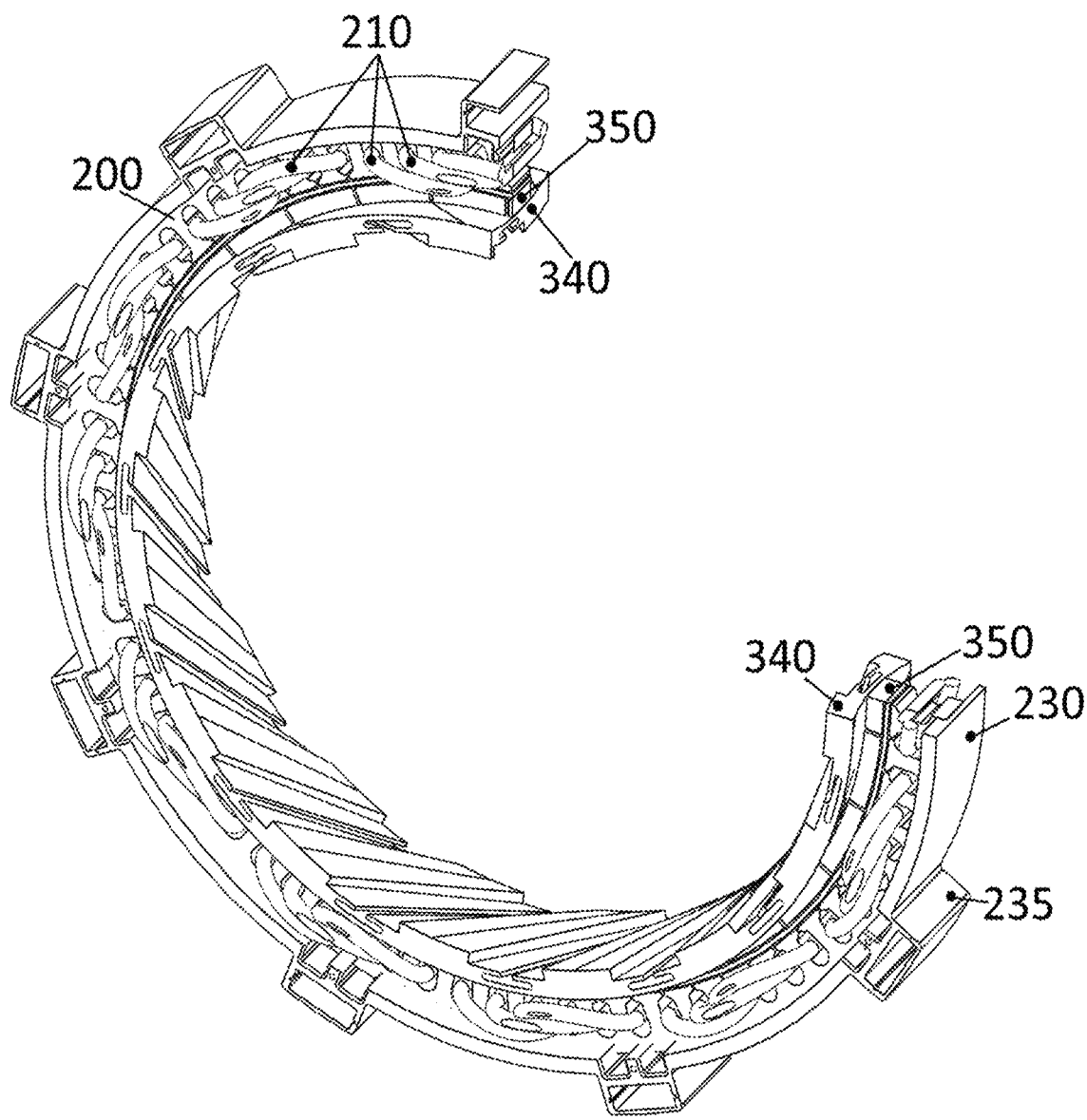
FIG. 12 is a perspective, partial section view of a permanent magnet motor of the electric propulsion system of FIG. 1.

FIGS. 10 to 12 illustrate an example stator 200. With reference to FIG. 11, stator 200 includes a plurality of windings 210. Windings 210 may be made of copper, copper alloys, or other suitable materials.

With reference to FIG. 12, rotor shroud 340 and rotor magnets 350 are dimensioned to nest concentrically within stator 200. In the illustrated configuration, stator 200 and rotor and fan assembly 300 may be characterized as a rim driven permanent magnet electric machine, or as a rim driven permanent magnet motor.

Stator windings 210 may be arranged in any suitable configuration. Preferably windings 210 are arranged as a set of poly-phase multi-polar stator windings 210. For example, the relatively large diameter of stator 200 may provide a sufficient number of stator slots 205 to mount windings for three or more phases, with redundant windings for added fault tolerance. Stator windings 210 may be connected in star or delta configuration.

Rotor magnets 350 may be arranged in any suitable configuration. For example, magnets 350 may be polarized in a Halbach configuration. Other configurations (e.g. parallel, radial) may be used in one or more alternative embodiments.

In the illustrated examples, shroud 340 of rotor and fan assembly 300 may be characterized as the 'back iron' of the rotor. In some embodiments, shroud 340 may have one or more magnetic laminations, and/or may be made of metallic or composite alloys. Alternatively, shroud 340 may be substantially free of magnetic components (e.g. little or no steel). Such configurations—i.e. substantially free of 'back iron'—may be characterized as 'air core' electric machines.

Preferably, the electric machine (including stator 200 and rotor and fan assembly 300) has a relatively high aspect ratio between its diameter and its axial length. For example, with reference to FIG. 4, an inner diameter $D_{stator}$ of stator 200 may be at least 4 times, at least 10 times, or at least 20 times greater than an axial length $L_{stator}$ between the first end 202 and second end 204 of stator 200.

Providing an electric machine with a high aspect ratio may have one or more advantages. For example, it may facilitate the electric machine higher to be scaled up to provide a higher mechanical output power without reaching magnetic saturation in the yoke or in the teeth of the stator. Additionally, or alternatively, a relatively small axial length may promote reduced weight and/or inertia of the rotor and fan assembly 300. Additionally, or alternatively, a relatively small axial length may reduce skin drag associated with boundary layer formation of an outboard surface of nacelle 100.

FIGS. 10 and 11 illustrate an example stator enclosure 220, which may be alternatively characterized as a stator housing 220. In the illustrated example, stator enclosure 220 includes an annular casing 230 positioned concentrically around stator 200, a front stator face plate 240 coupled to a first end 232 of annular casing 230, and a rear stator face plate 250 coupled to a second end 234 of annular casing 230. While illustrated as separate components, it will be appreciated that annular casing 230 and at least one front stator face plate 240 and rear stator face plate 250 may be integrally formed.

Stator enclosure 220 may be a structural component of the electric propulsion system 1000. For example, enclosure 220 may provide various mounting and attachment points for external connections. For example, annular casing 230 may have a number of radial fins or flanges 235 for supporting one or more condensers used in a stator cooling system.

In the illustrated example, front stator face plate 240 includes a plurality of cooling fins 245 projecting from a front surface 242. Cooling fins 245 may provide improved thermal management for stator 200 (e.g. by facilitating end winding conduction cooling). It will be appreciated that cooling fins 245 may be welded to face plate 240, or integrally formed (e.g. via CNC milling). Fins 245 may be made from any suitable material, such as an aluminum alloy.

Optionally, a gasket (not shown) may be provided between front stator face plate 240 and the first end 232 of the annular casing 230. For example, such a gasket may provide a watertight seal between front stator face plate 240 and annular casing 230. Additionally, or alternatively, a gasket (not shown) may be provided between rear stator face plate 250 and the second end 234 of annular casing 230. Preferably, the overall stator enclosure 220 may have an Ingress Protection Code rating of IP65 or higher.

Components of stator enclosure 220 (e.g. annular casing 230) may be constructed, for example, by 3D printing (or by another suitable additive manufacturing method) a shell with a tetrahedral lattice infill, and subsequently removing material (e.g. by grinding, polishing) from sections where high tolerances are required (e.g. to facilitate the provision of a watertight seal). Such a structure may have desirable performance/weight properties.

As another example, components of stator enclosure 220 may be constructed from bent extrusion sections (e.g. of an aluminum alloy) joined to create full circumferential components. Alternatively, components of stator enclosure 220 may be die cast in sections (e.g. high pressure aluminum alloy castings). Such structures may have desirable performance/cost properties.

Power control electronics (not shown) for the electric machine may be provided in any suitable location. For example, power control electronics may be provided within stator enclosure 220, or elsewhere within nacelle 100. In some embodiments, due to the large diameter of stator 200, power electronics may be attached directly on an outer surface 238 of annular casing 230. Such a location may reduce or minimize the length of power leads. Providing relatively short power leads (e.g. less than 1 m) may facilitate operation at higher input electrical frequencies (e.g. over 1 kHz) and/or with higher input voltages (e.g. 800 V or more). Additionally, or alternatively, providing power electronics in close proximity to stator 200 may allow a stator cooling system to also be used for power electronics cooling. Alternatively, power electronics may be positioned elsewhere in nacelle 100, and/or within a fuselage of an aircraft to which electric propulsion system 1000 is mounted.

Figure 13:
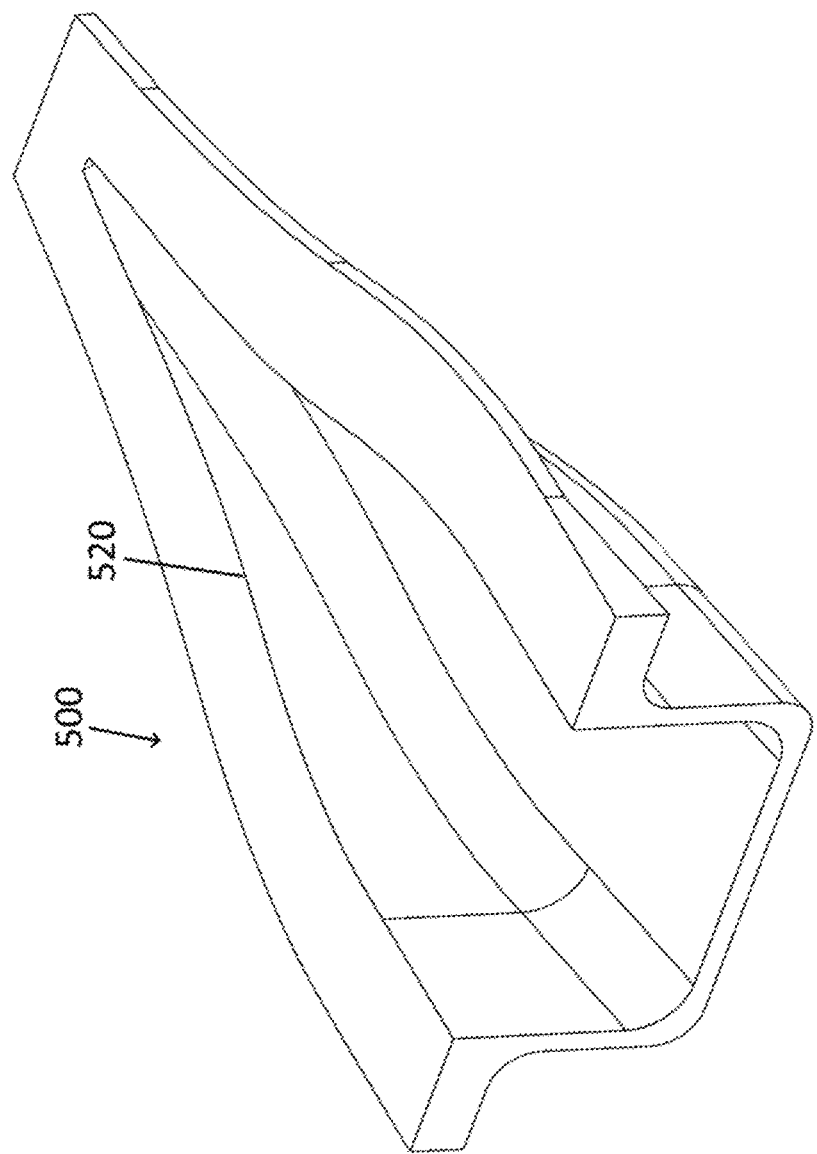
FIG. 13 is a perspective rendering of a recessed duct, in accordance with one embodiment.

FIG. 13 illustrates an example of a cooling duct 500 for drawing air passing over the nacelle 100 into condensers for assisting with thermal regulation of stator 200. Preferably, cooling duct 500 is a low-drag air inlet, e.g. it may be characterized as a NACA duct.

Figure 14:
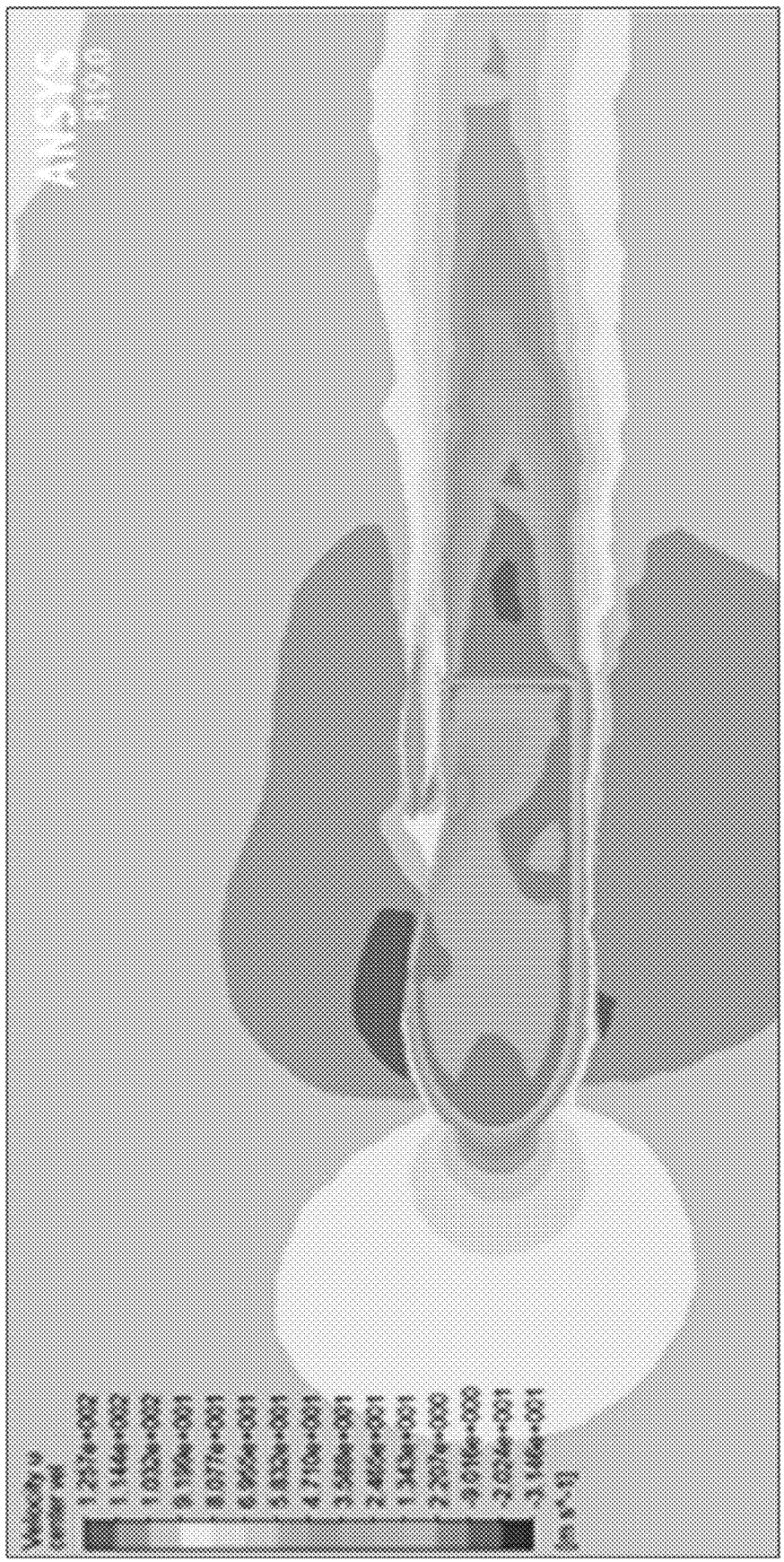
FIG. 14 is a model of airflow behavior for the recessed duct of FIG. 13.

In the illustrated example, filleted edges 520 are configured to deflect boundary layer air and to draw in free stream air to an inlet of a condenser positioned inside nacelle 100. FIG. 14 shows output from a model of airflow through a cooling duct 500, with the gradient regions representing expected local air flow velocities.

As illustrated in FIGS. 1 and 2, cooling ducts 500 are preferably mounted substantially flush with an outer surface of nacelle 100.

Cooling ducts 500 may be constructed in any suitable fashion. For example, ducts 500 may be formed by molding or 3D printing thermoplastic material. During assembly, ducts 500 may be secured in cutouts in nacelle 100 and adhered (e.g. epoxied) into place. While illustrated as separate components, it will be appreciated that ducts 500 may be integrally formed with an outer surface of nacelle 100.

Figure 15:
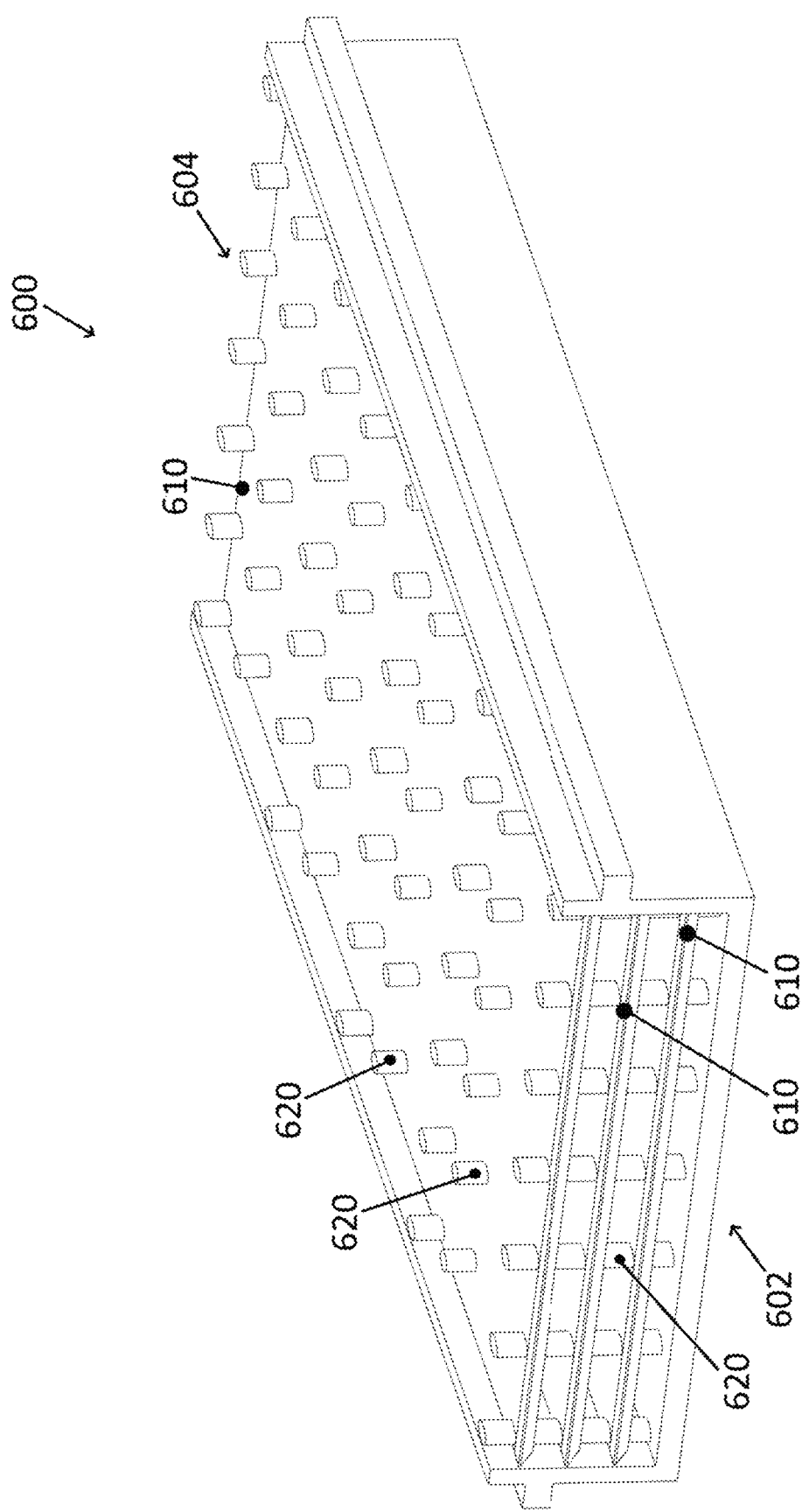
FIG. 15 is a perspective rendering of a condenser, in accordance with one embodiment.

FIG. 15 illustrates an example of a condenser 600 for transferring heat from a stator cooling system to air directed through the condenser by a cooling duct 500. In the illustrated example, condenser 600 is a cross flow condenser. It will be appreciated that other condenser topologies may be employed in alternative embodiments.

Preferably, condenser 600 facilitates a high rate of heat dissipation, provides an efficient flow path for forced air convection, and has sufficient structural integrity for expected loading conditions. To address these design goals, it may be desirable to determine a balance between minimizing the surface area in contact with the airflow to lower the pressure drop across the condenser, and maximizing the surface area in contact with the airflow to increase the heat transfer rate. For example, various design parameters may be iterated to provide a sufficient, or preferably optimal, balance between these competing goals.

In the illustrated example, condenser 600 includes a series of plates 610 separated by pins 620. Such an arrangement advantageously allows heat to spread via conduction in three dimensions.

In the illustrated example, pins 620 have an elliptical cross-sectional profile. Providing elliptical pins 620 may promote steady turbulent flow, which may result in a relatively high rate of heat transfer.

Figure 16:
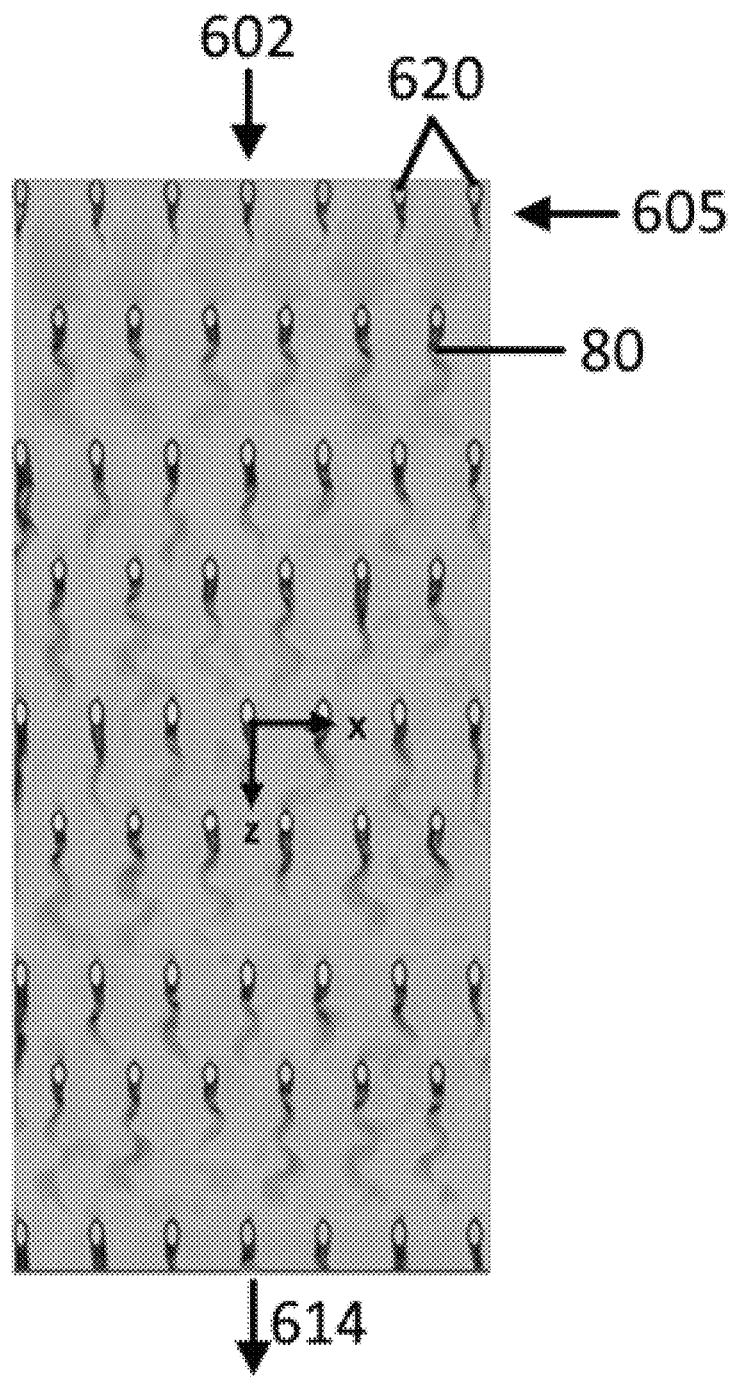
FIG. 16 is a model of airflow behavior for the condenser of FIG. 15.

FIG. 16 shows velocity plot output from a computational fluid dynamics (CFD) model of a condenser 600. Streamlines 80 indicate local air velocity across a plate 610. Notably, the row 605 of pins 620 along the inlet end 602 of condenser 600 assist in guiding air flow into the condenser 600.

Condenser 600 may be constructed in any suitable fashion. For example, plates 610 and/or pins 620 may constructed from an aluminum alloy, e.g. by 3D printing or by another suitable additive manufacturing method.

Figure 17:
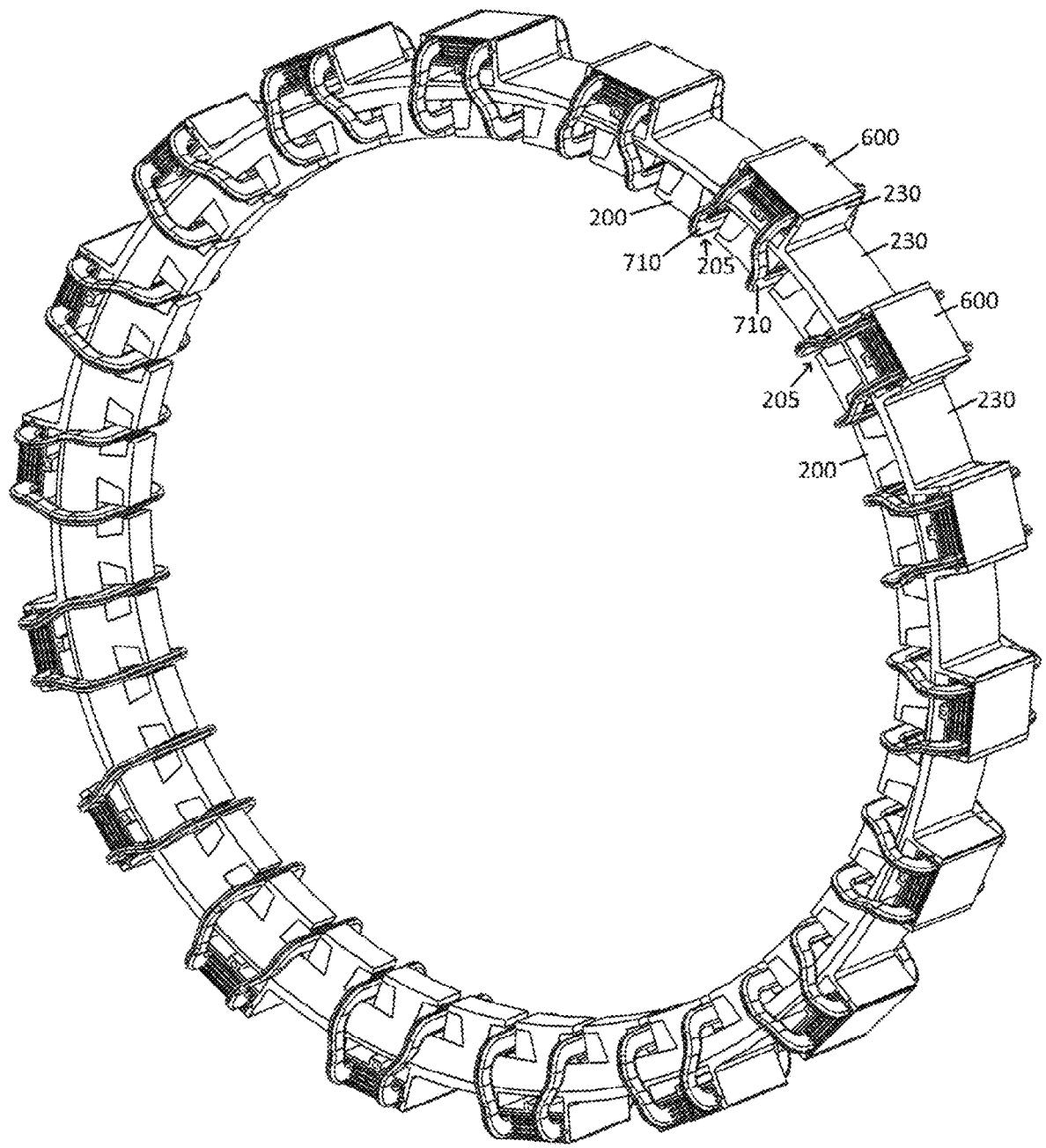
FIG. 17 is a perspective view of a stator cooling system, in accordance with one embodiment.
Figure 18:
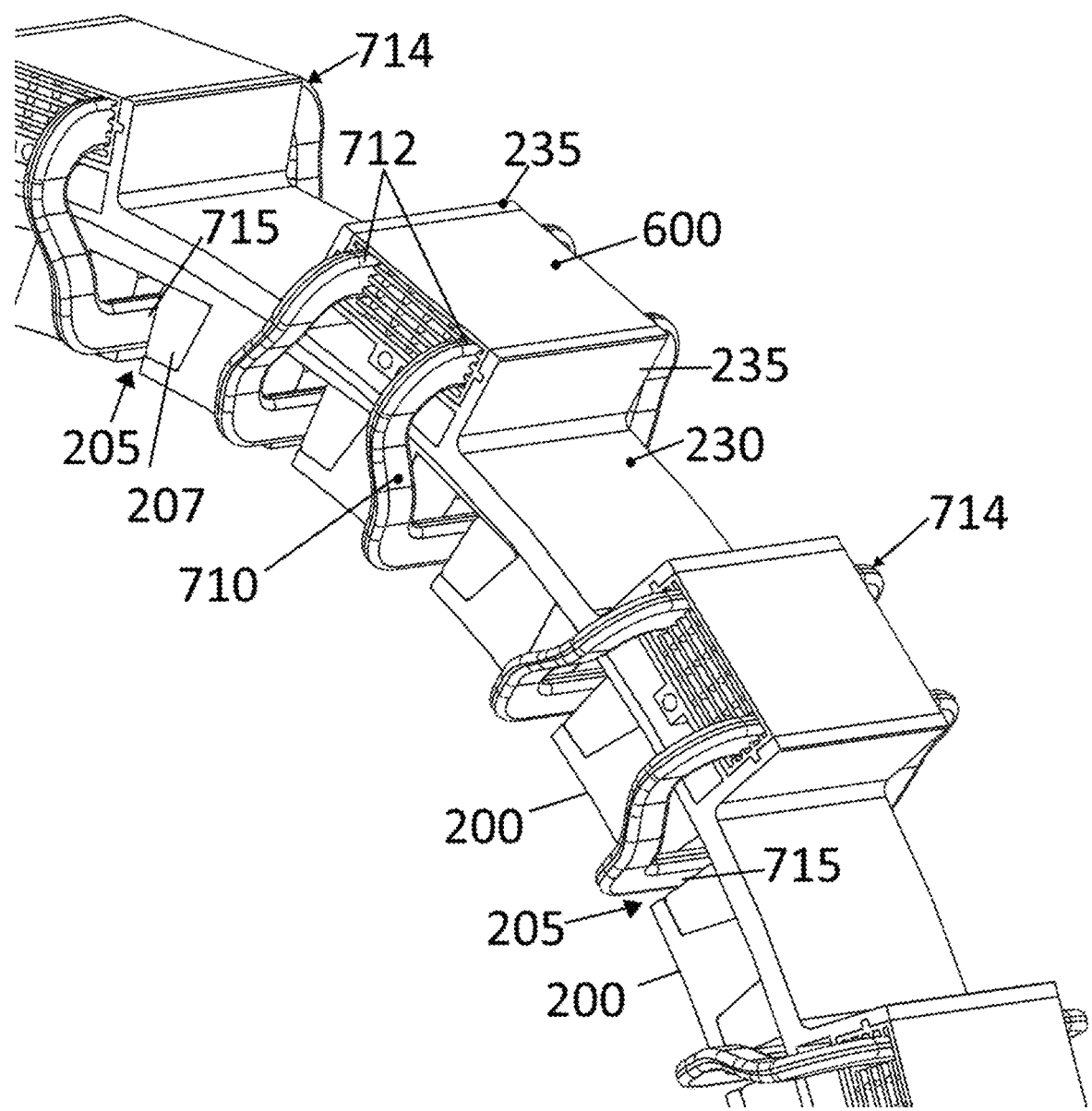
FIG. 18 is a perspective view of a portion of the stator cooling system of FIG. 17.

FIGS. 17 and 18 illustrate an example of a stator cooling system for transferring heat from stator windings 210 during operation of electric propulsion system 1000. In the illustrated configuration, a number of individual heat pipes 710 are provided to transfer thermal energy from stator windings 210 to condensers 600. Such a system may be characterized as a passive stator cooling system.

In the illustrated example, a portion 715 of each heat pipe 710 is positioned in a stator slot 205, abutting at least one stator winding 210. A first end 712 of each heat pipe 710 is coupled to the first end 602 of a condenser 600, and a second end 714 each heat pipe 710 is coupled to the second end 604 of condenser 600. In operation, fluid within heat pipe 710 circulates between condenser 600 and portion 715 due to a thermal gradient between portion 715 and condenser 600. For example, heat pipes 710 may be thermosiphon pipes that use an internal thermodynamic cycle to transfer heat at a relatively high flux.

In the illustrated example, heat pipes 710 have generally flat sides. It will be appreciated that heat pipes 710 may have alternative shapes (e.g. oval, circular).

Providing separate heat pipes 710 may have one or more advantages. For example, individual pipes 710 may be removed and/or replaced during e.g. routine maintenance.

Heat pipes 710 may be constructed in any suitable fashion. For example, pipes 710 may be 3D printed with a relatively complex internal 'wick' structure, which may improve evaporator performance. Alternatively, drawn or extruded tubing may be cut, bent, and capped to form pipes 710. Optionally, a sintered metal powder wick may be inserted before capping.

Figure 19:
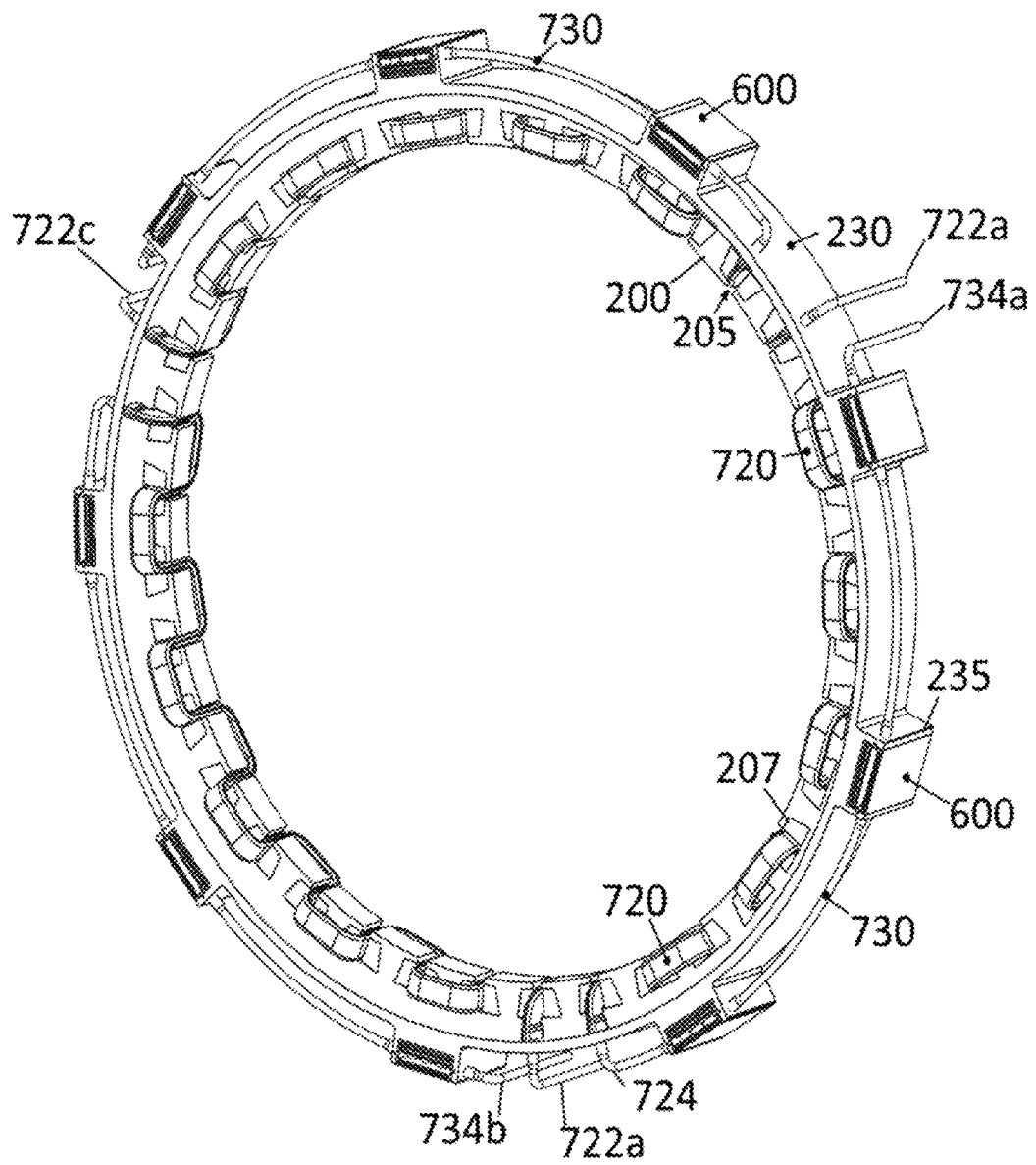
FIG. 19 is a perspective view of a stator cooling system, in accordance with another embodiment.
Figure 20:
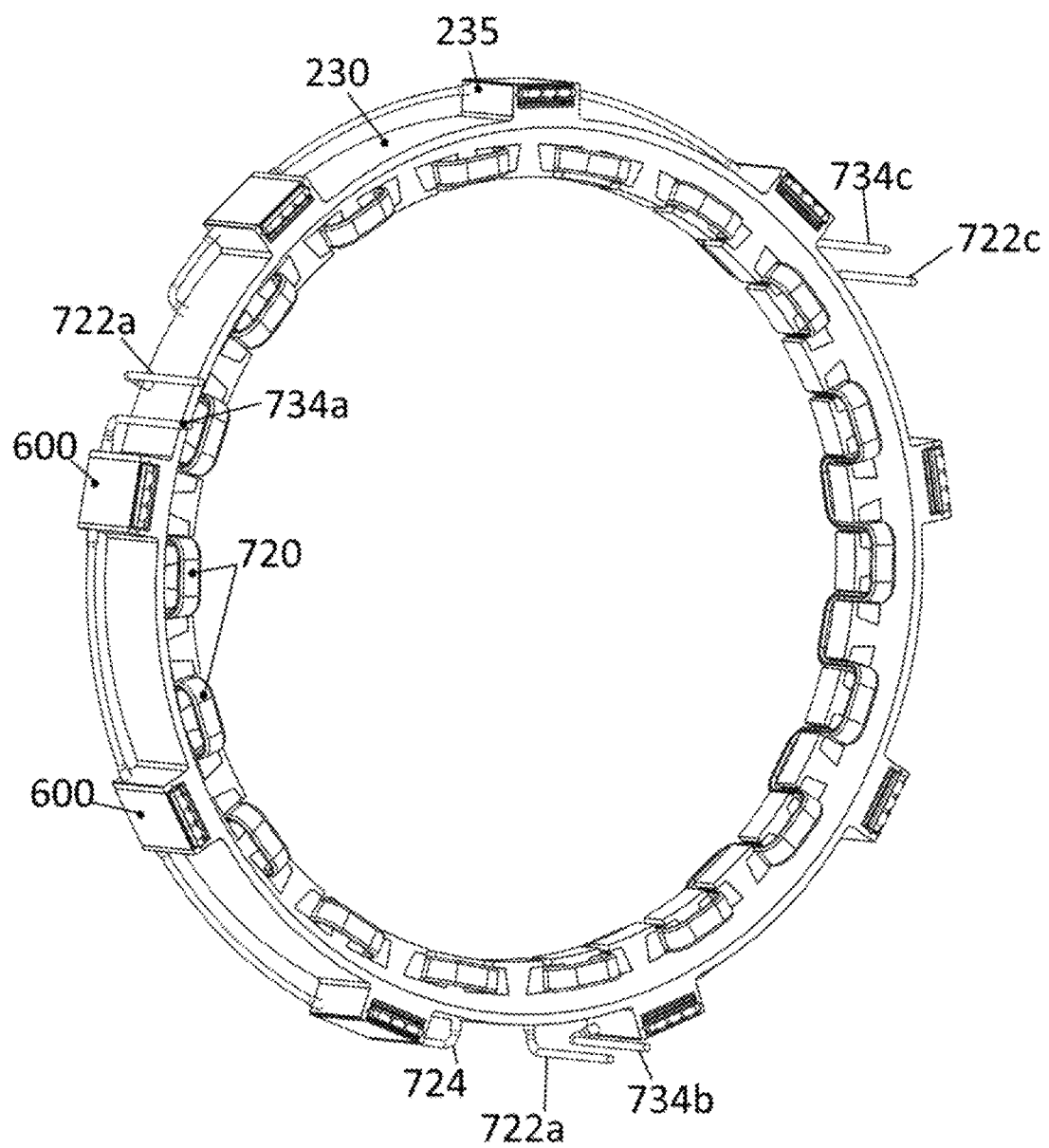
FIG. 20 is another perspective view of the stator cooling system of FIG. 19.
Figure 21:
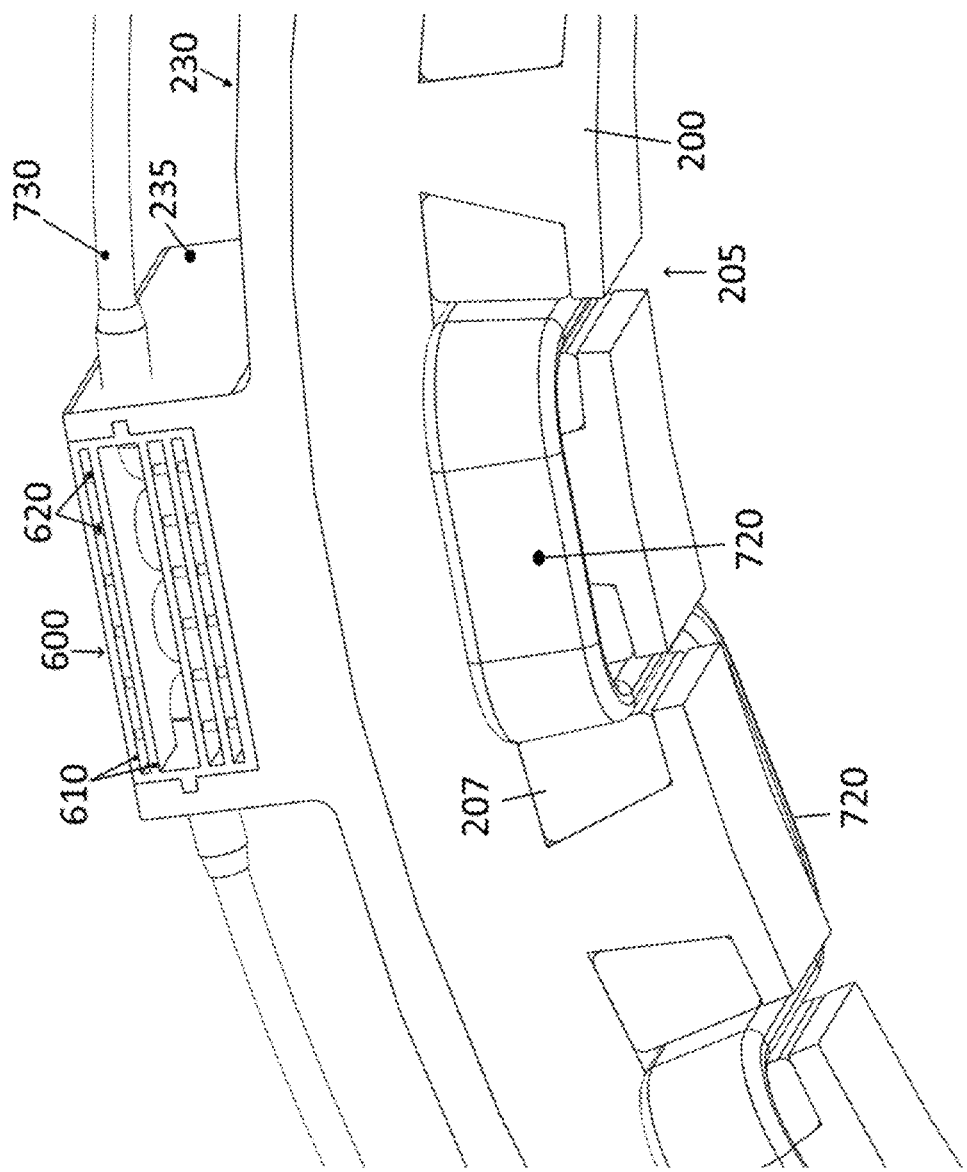
FIG. 21 is a perspective view of a portion of the stator cooling system of FIG. 19.

FIGS. 19 to 21 illustrate another example of a stator cooling system for transferring heat from stator windings 210 during operation of electric propulsion system 1000. In the illustrated configuration, a number of fluid conduits 720 that pass through multiple stator slots 205 are arranged in series fluid communication with a set of condensers 600. In operation, fluid is pumped through each conduit 720 and condensers 600 to which conduit 720 is coupled. Such a system may be characterized as a hybrid forces air-liquid active stator cooling system.

In the illustrated example, each fluid conduit 720 passes through a number of stator slot 205 in a zig-zag pattern, abutting at least one stator winding 210 in each slot 205 through which it passes. An inlet end 722 of each conduit 720 is in fluid communication with a fluid pump (not shown). An outlet end 724 of each conduit 720 is in fluid communication with one or more condensers 600, e.g. via intermediate tubing 730. In operation, fluid is pumped through conduit 720, where it may receive thermal energy from stator windings 210 via conduction through the conduit wall. The (now heated) fluid is then pumped through one or more condensers 600 to transfer heat from the fluid to air passing through the condensers, and then back to a pump (not shown) via outlet 734.

In the illustrated example, there are three cooling 'loops', with inlets 722a, 722b, and 722c, and outlets 734a, 734b, and 734c. It will be appreciated that one, two, or four or more cooling 'loops' may be provided in alternative embodiments.

Conduit 720 may be constructed in any suitable fashion. For example, drawn, rolled, or extruded tubing may be bent to form conduit 720. Preferably, portions of conduit 720 that are in contact with conductors in stator slots 205 are flattened in order provide increased contact area.

Figure 22:
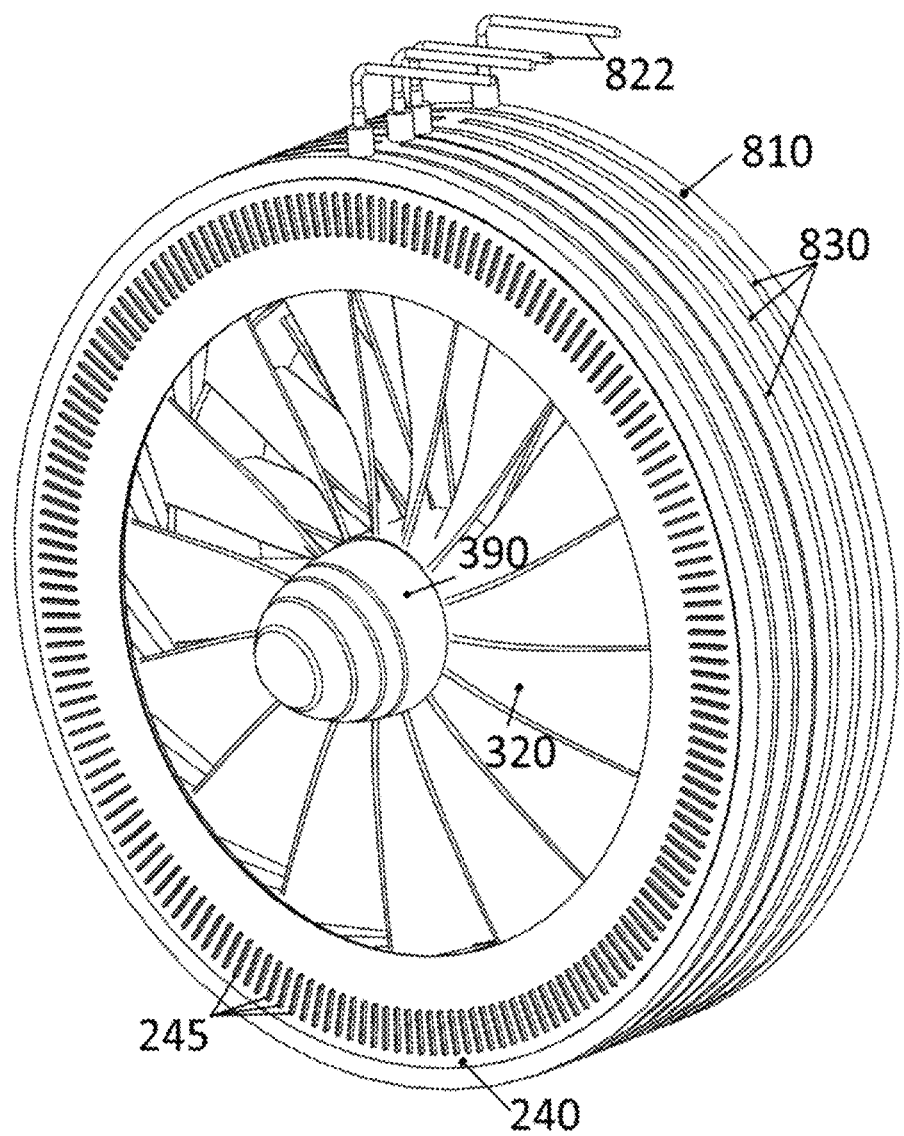
FIG. 22 is a perspective view of a stator cooling system, in accordance with another embodiment.
Figure 23:
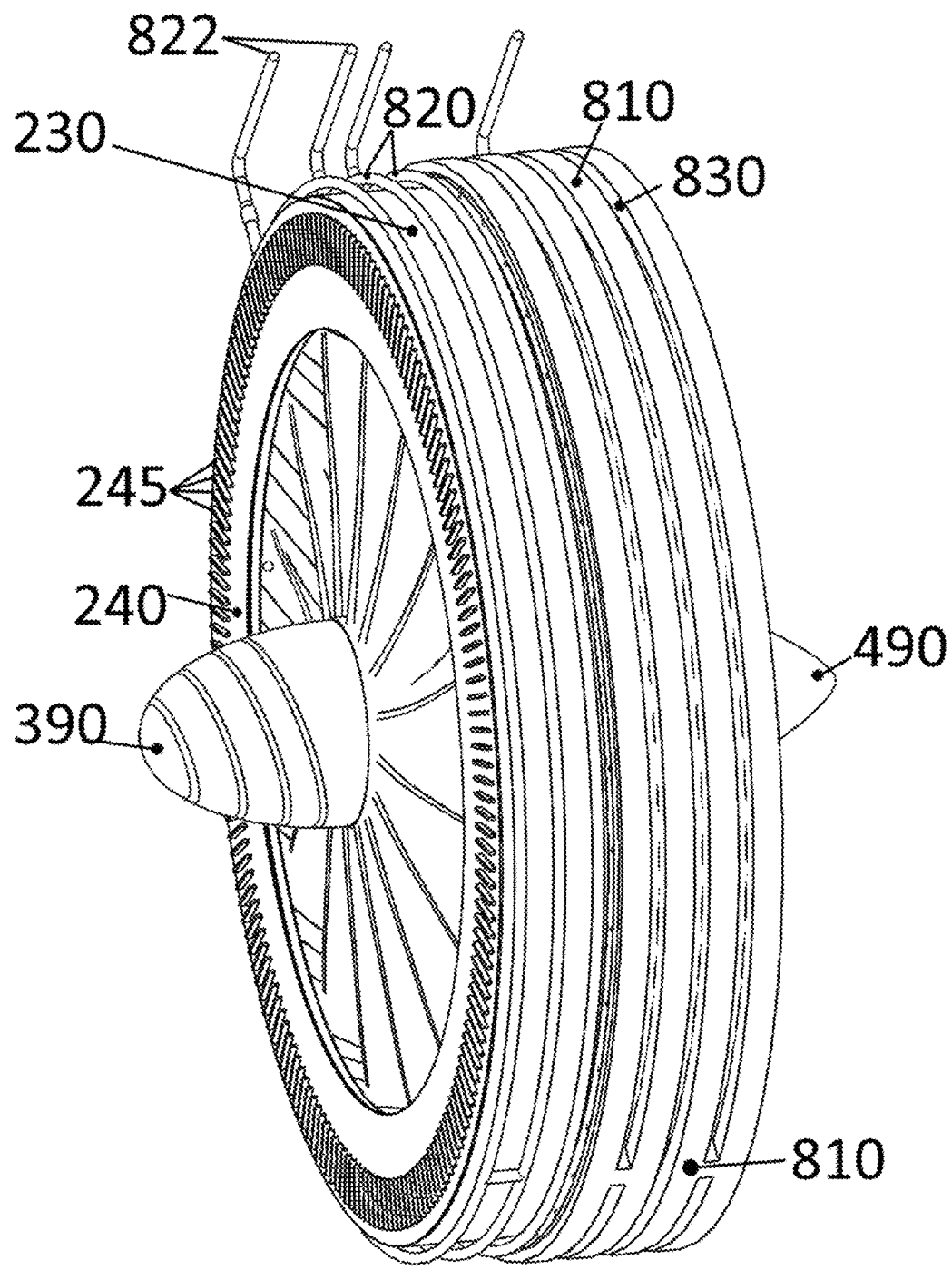
FIG. 23 is another perspective view of the stator cooling system of FIG. 22, with portions of the jacketing removed for clarity.

FIGS. 22 and 23 illustrate another example of a stator cooling system for transferring heat from stator windings 210 during operation of electric propulsion system 1000. In the illustrated configuration, condensers 600 and cooling ducts 500 are not provided. Instead, a fluid jacket is provided for stator enclosure 220. Such a system may be characterized as an active stator cooling system.

As shown in FIG. 23, fluid jacket 800 includes a fluid jacket body 810 in which a plurality of cooling conduits 820 are provided. Cooling conduits 820 extend between inlet and/or outlet ends 822, and are configured to allow the circulation of a cooling fluid through the cooling jacket body 810. In the illustrated example, a plurality of slots 830 extend radially through the fluid jacket body 810. Slots 830 may be used to accommodate wiring for the electrical phase connections, and/or to accommodate structural connections between stator enclosure 220 and nacelle 100.

Providing a cooling jacket 800 may have one or more advantages. For example, cooling jacket 800 may be configured to operate in severe operating conditions and/or environments. In this respect, a cooling system that does not require the use of cooling ducts 500 may make it easier to maintain the watertight integrity of stator enclosure 220.

Figure 24:
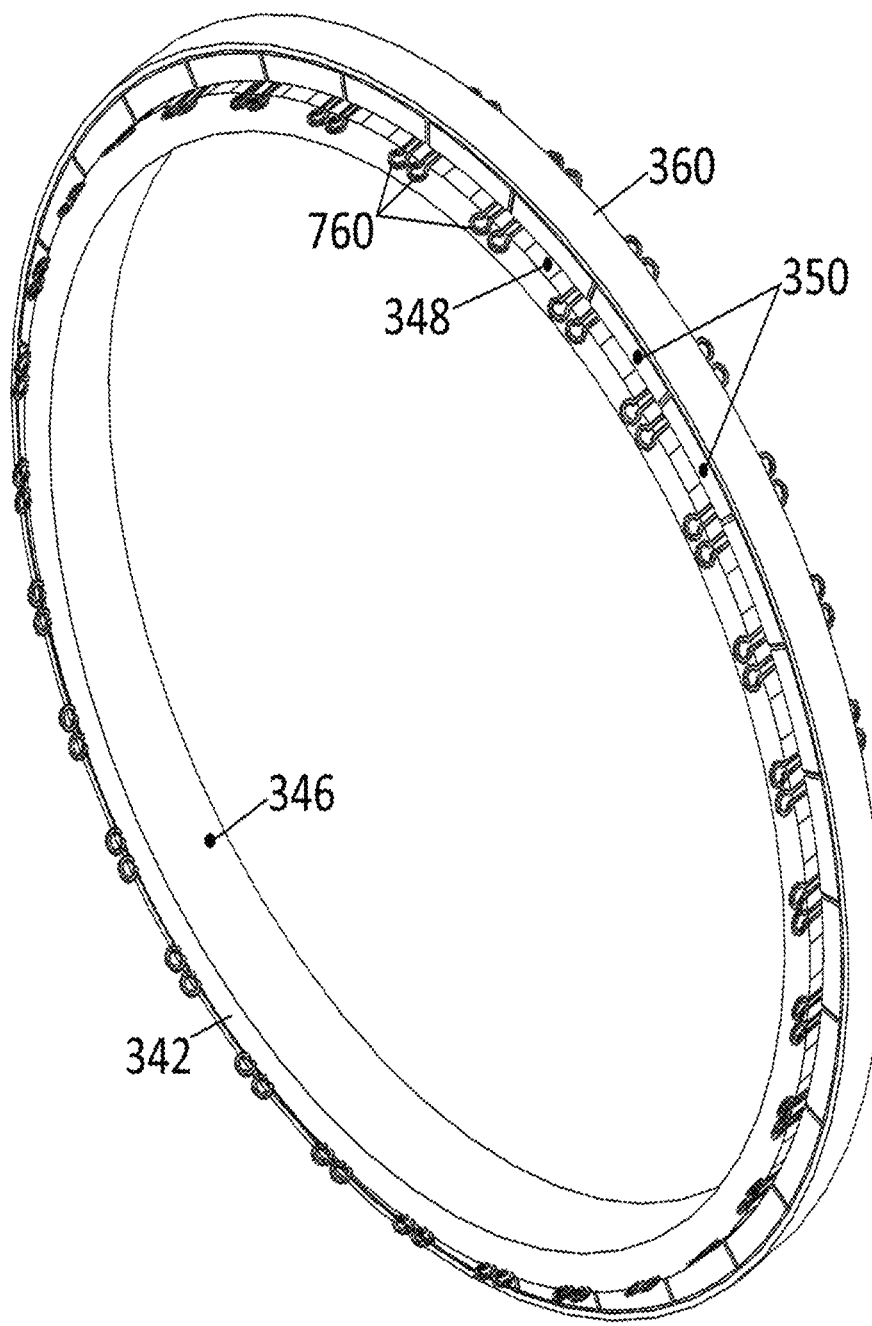
FIG. 24 is a perspective view of a rotor cooling system, in accordance with one embodiment.
Figure 25:
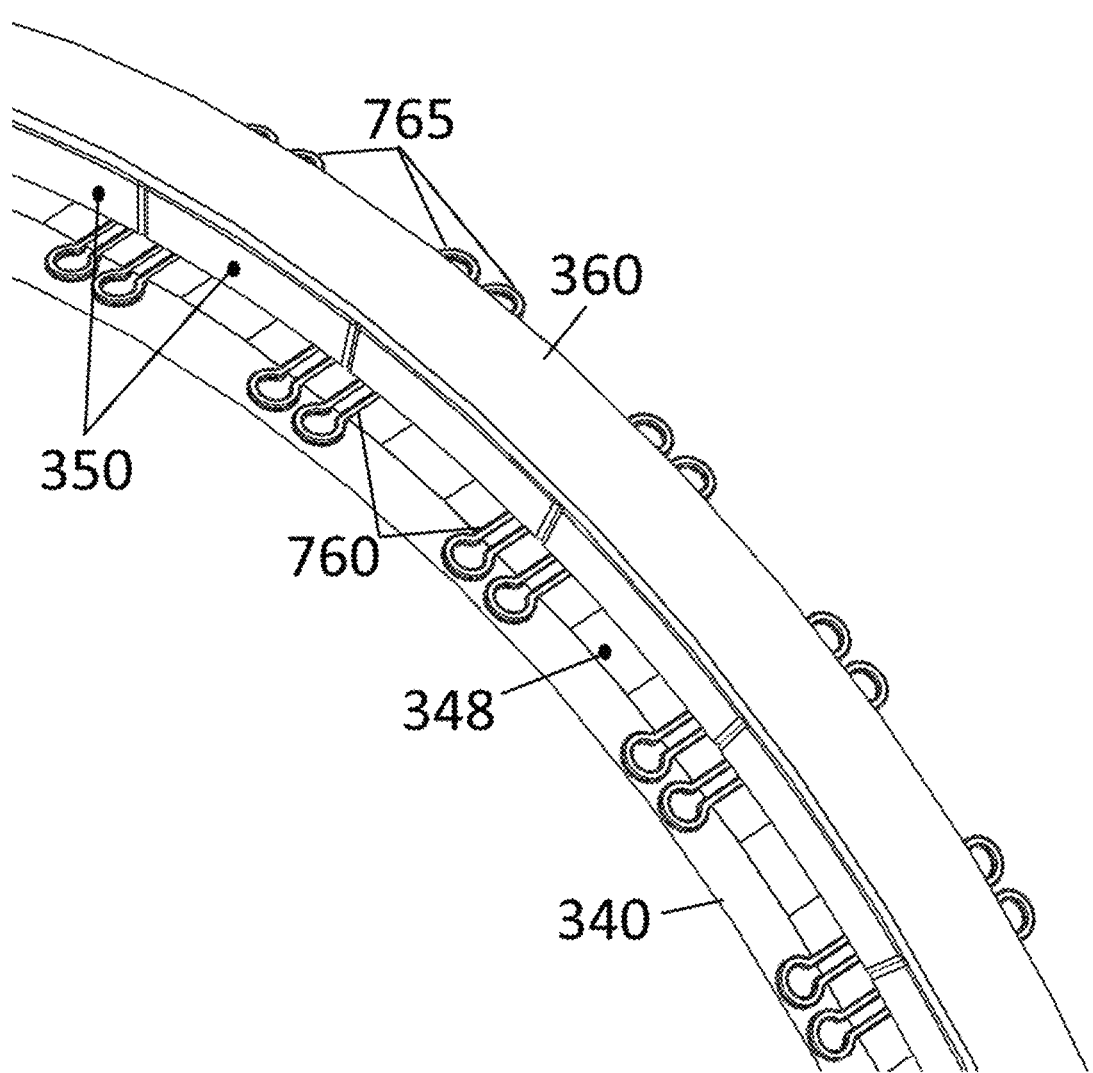
FIG. 25 is a perspective view of a portion of the rotor cooling system of FIG. 24.

FIGS. 24 and 25 illustrate an example of a rotor cooling system for transferring heat from rotor magnets 350 during operation of electric propulsion system 1000. In the illustrated configuration, a number of individual rotor heat pipes 760 are provided to transfer thermal energy from rotor magnets 350. Such a system may be characterized as a passive rotor cooling system.

In the illustrated example, a portion of each rotor heat pipe 760 abuts at least one rotor magnet 350. For example, rotor heat pipes 760 may be embedded in the outer surface of fan shroud 340. Each rotor pipe 760 may be at least partially filled with a working fluid, such as water-glycol or ammonia for transferring thermal energy. In operation, heat from magnets 350 is transferred to the working fluid within rotor heat pipe 760, causing vapor 'slugs' to form and expand along the rotor pipe 760. Such vapor 'slugs' move perpendicular to magnets 350 to portions 762 of rotor pipe distal from magnets 350, where the temperature gradient between the air through which the portions are rotating condenses the 'slugs' back into a fluid state. This results in oscillatory fluid motion inside rotor heat pipe 760. Similar 'pulsating' heat pipes have been tested in applications with high inertial forces (e.g. for fighter jet aircraft).

In the illustrated example, rotor heat pipes 760 have a generally 'dog bone' shape, with portions 762 distal from magnets 350 having a rounded shape. It will be appreciated that rotor heat pipes 760 may have any suitable shape (e.g. oval, circular).

In the illustrated example, there are two rotor heat pipes 760 per magnet 350. It will be appreciated that one, three, or four or more rotor heat pipes 760 may be provided for each magnet 350 in alternative embodiments.

Rotor heat pipes 760 may be constructed in any suitable fashion. For example, pipes 760 may be 3D printed with a relatively complex internal 'wick' structure and porosity, which may improve thermal performance. Alternatively, drawn or extruded tubing may be cut, bent, and capped to form pipes 760. Optionally, a sintered metal powder wick may be inserted before capping.

Figure 26:
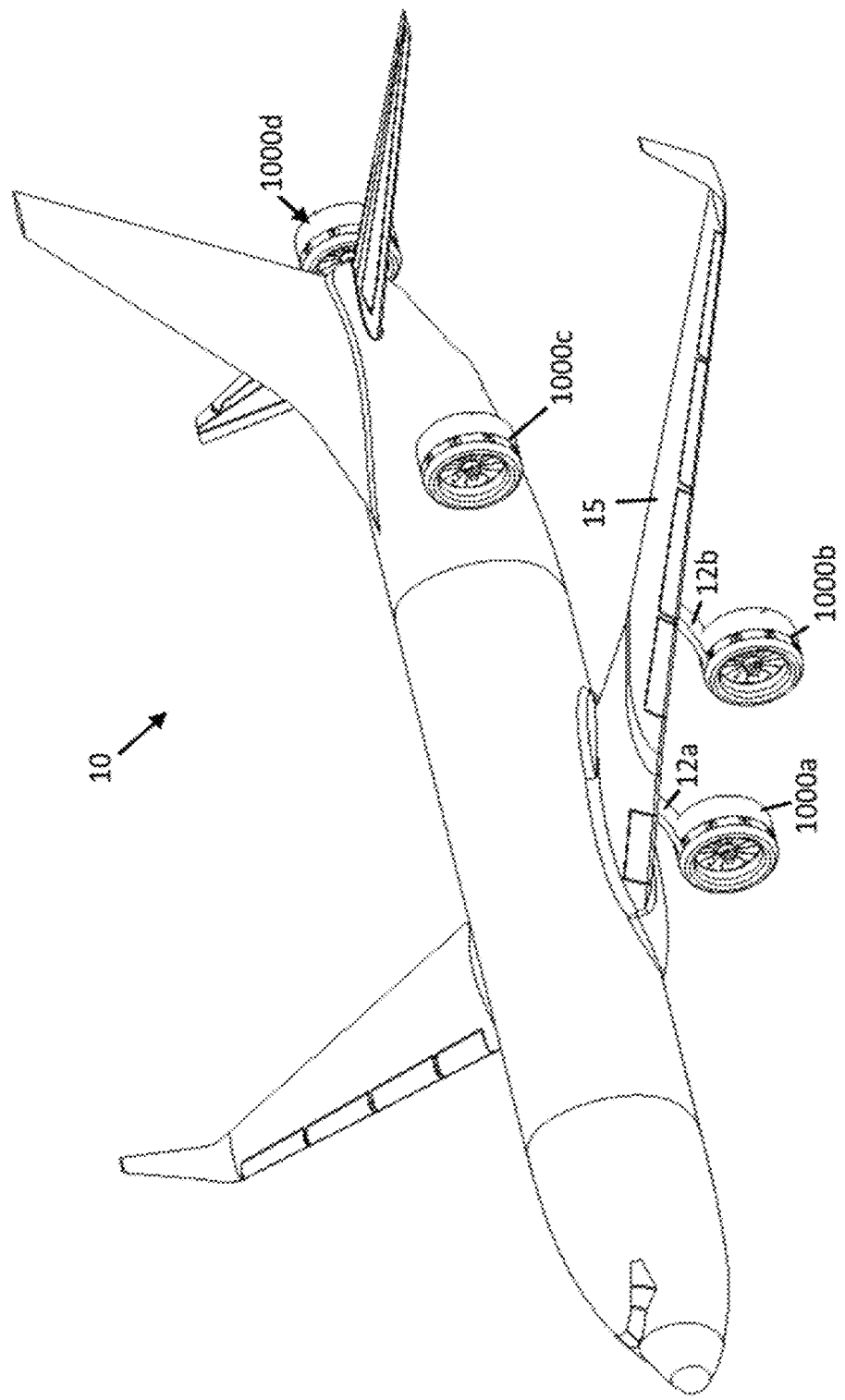
FIG. 26 is a perspective view of an aircraft showing example mounting locations for electric propulsion systems.

FIG. 26 illustrates a forward flight aircraft 10, with electric propulsion systems 1000 mounted in various possible locations. For example, electric propulsion systems 1000a and 1000b are shown in underwing locations. The propulsion systems 1000a, 1000b are secured to the wing 15 by pylons 12a, 12b.

An electric propulsion system 1000c is mounted to the body of a fuselage.

An electric propulsion system 1000d is mounted to the rear of the airframe, and may be characterized as being integrated into the fuselage to act as a Boundary Layer Ingestion (BLI) propulsion system.

It will be appreciated that the number of electric propulsion systems 1000 and their mounting locations may vary depending on the overall design of the aircraft.

In addition to, or as an alternative to, providing primary thrust, the compact profile of electric propulsion system 1000 may facilitate its use as an auxiliary emergency landing motor in the case of catastrophic failure of an aircraft thrust or lift characteristics. For example, one or more electric propulsion system 1000s may be configured to act as emergency thrust (e.g. to be used to either speed up the aircraft to regain lift on the wing) and/or as an emergency VTOL landing device.

Figure 27:
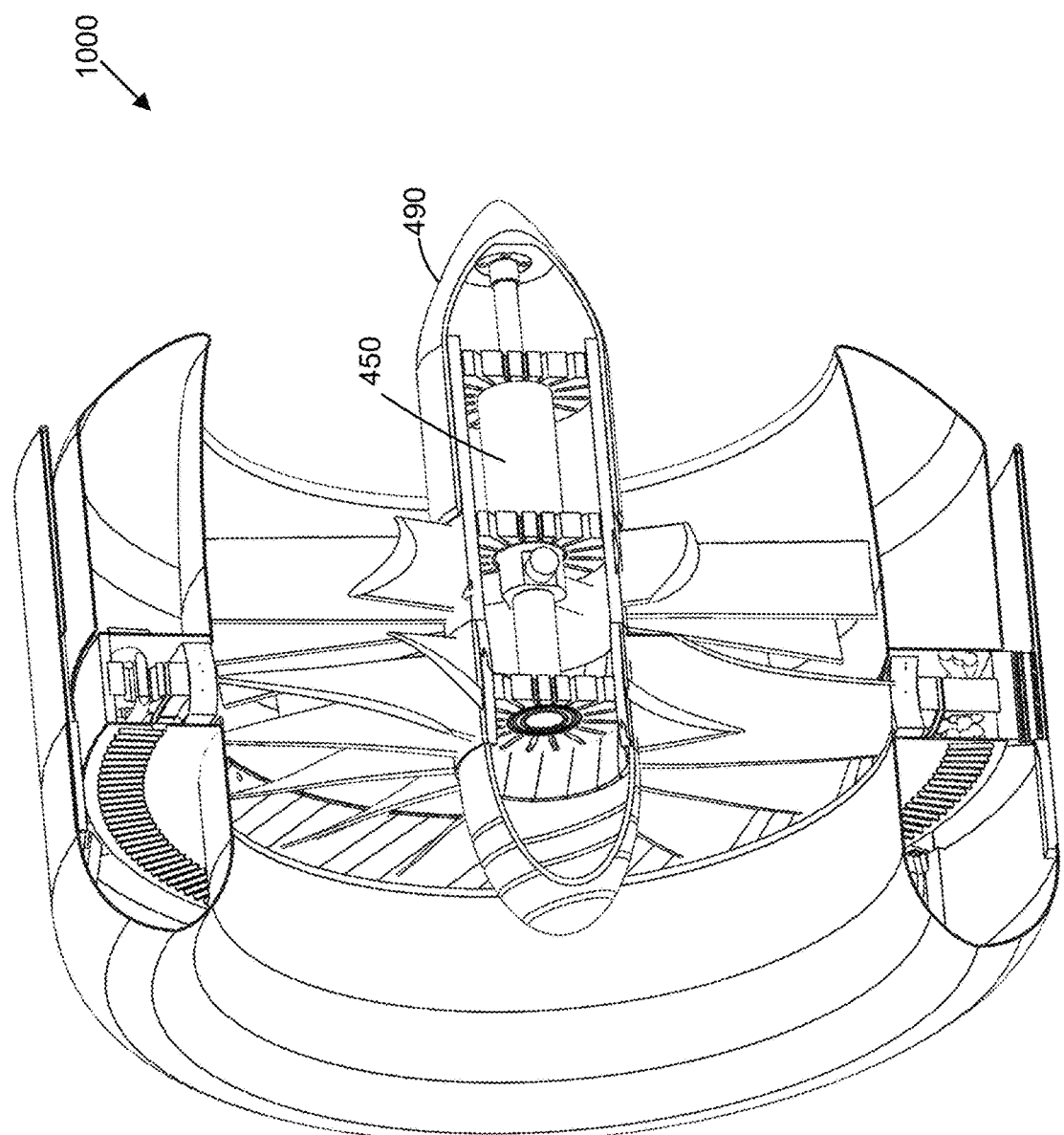
FIG. 27 is a perspective section view of an electric propulsion system for an aircraft, in accordance with another embodiment, with a hub fairing in a retracted position.
Figure 28:
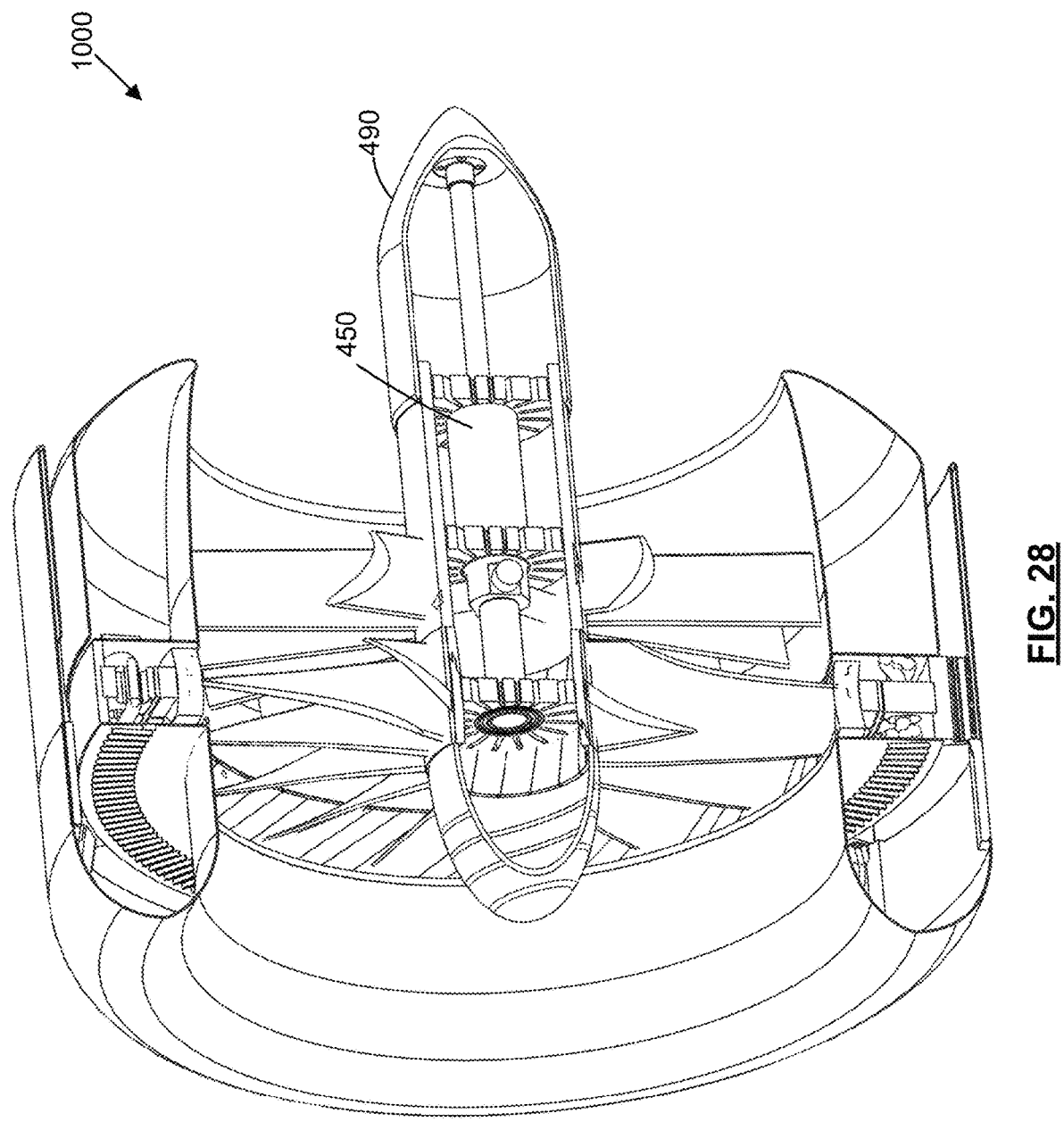
FIG. 28 is another perspective section view of the electric propulsion system of FIG. 27, with the hub fairing in an extended position.
Figure 29:
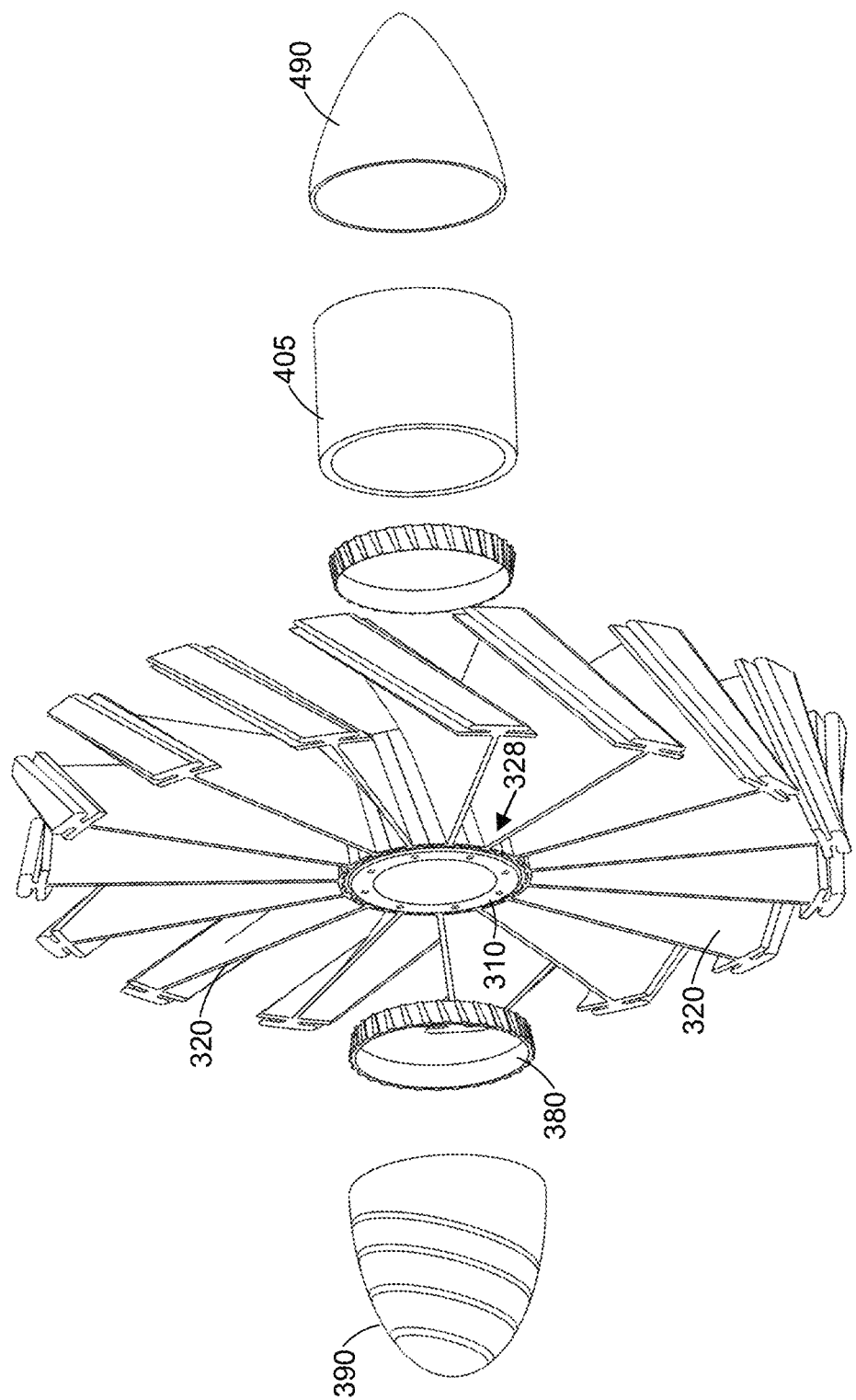
FIG. 29 is a partially exploded perspective view of a fan hub and fan blade assembly, in accordance with another embodiment.
Figure 30:
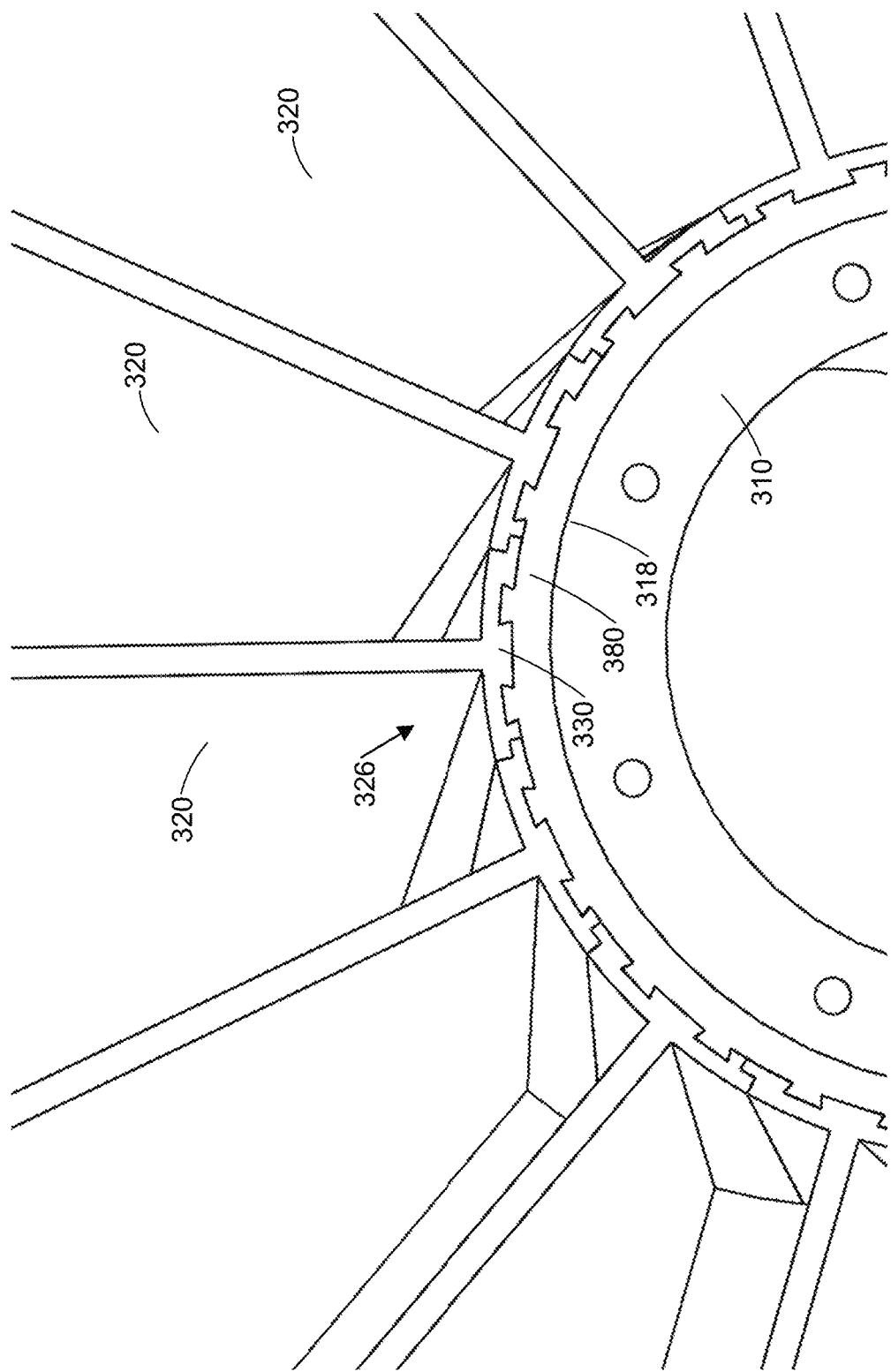
FIG. 30 is an perspective end view of the fan hub and fan blade ends of FIG. 29.

FIGS. 27 and 28 illustrate an example of an adjustable aft fairing. In this example, hub fairing 490 may be moved between a retracted position (e.g. as shown in FIG. 27) and an extended position (e.g. as shown in FIG. 28). In the illustrated example, hub fairing 490 is connected to a linear actuator 450 (e.g. a linear electric motor, a hydraulic actuator) that can selectively extend and retract in the axial direction.

By selectively repositioning hub fairing 490, the cross-sectional area of the exit flow nozzle 124 may be modulated, e.g. to improve the surge margin of the fan for a range of conditions and improve efficiency. For example, high bypass ratio fans with low pressure ratios (i.e. 1.5) typically operate with lower air accelerations and high mass flow rates to increase propulsive efficiency. However, due to this low-pressure ratio, which is intrinsic to the design, the fan operates close to surge conditions in certain scenarios such as during takeoff where the pressure ratio must be decreased by lowering fan speed to avoid stalling the engine.

Providing a variable area exit nozzle may result in an additional control factor to change fan pressure ratio independent of fan speed. A consequence of this is that the fan may operate at an improved, or preferably optimum, balance of fan and propulsive efficiencies for a wide range of flight conditions. For example, during takeoff, fairing 490 may be positioned in a retracted position (e.g. as shown in FIG. 27) to open the exit nozzle thereby operating the fan further away from surge conditions and towards a maximum efficiency for any required thrust. During cruise conditions, fairing 490 may be moved to an extended positon (e.g. as shown in FIG. 28) to close the exit nozzle thereby increasing the efficiency of the fan. Another possible advantage of providing a wider surge margin is that there may be less blade flutter/fatigue cycling, which may allow lighter fan blades to be used.

As discussed above, the stator 200 and rotor and fan assembly 300 of electric propulsion system 1000 may be operated as an electric motor, where electrical power is applied to rotate fan blades 320 to create mechanical thrust.

Alternatively, the stator 200 and rotor and fan assembly 300 of electric propulsion system 1000 may be operated as an electric generator. For example, during a descent or landing of an aircraft, stator 200 may be operated to generate resistance to the rotation of rotor and fan assembly 300. This may result in reduced net thrust provided by electric propulsion system 1000, leading to a reduction in the aircraft's speed. This may also result in the generation of electrical power, which may be used e.g. to charge one or more power sources (e.g. electrochemical batteries) on board the aircraft.

Electric propulsion system 1000 may have one or more advantages for VTOL aircraft. For example, electric propulsion system 1000 may have a very compact profile (in diameter and/or in length) and may therefore have relatively low drag, e.g. when compared to other central hub driven electric ducted fans. Such a compact profile may render electric propulsion system 1000 particularly suitable for e-VTOL applications, as electric propulsion system 1000 may be relatively easy to maneuver (e.g. pivot) relative to an airframe, and may also create less drag than other central hub driven electric ducted fans.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An electric propulsion system for an aircraft, the system comprising:
a nacelle of the aircraft defining a primary air flow path from an inlet end of the nacelle to an outlet end of the nacelle; and
an electric machine comprising:
a stator positioned in the nacelle and comprising one or more stator windings; and
a rotor and fan assembly positioned in the primary flow path, the rotor and fan assembly comprising:
a cylindrical fan shroud having a first end, a second end, an inner surface, and an outer surface;
a plurality of rotor magnets directly positioned on the outer surface of the fan shroud and concentric with the one or more stator windings;
a fan hub positioned concentrically interior of the fan shroud, the fan hub having a first end, a second end, an inner surface, an outer surface, and a fan axis of rotation, the fan hub being mounted on a central support shaft via one or more bearings; and
a plurality of fan blades extending between the fan shroud and the fan hub.

2. The system of claim 1, wherein the plurality of rotor magnets are loaded in compression in a radial direction when the rotor and fan assembly is at rest.

3. The system of claim 2, wherein the rotor and fan assembly further comprises a sleeve for securing the plurality of rotor magnets to the cylindrical fan shroud.

4. The system of claim 3, wherein the sleeve is a compression sleeve that applies a compressive load to the plurality of rotor magnets.

5. The system of claim 1, wherein an outer end of each fan blade is secured directly to the inner surface of the fan shroud.

6. The system of claim 5, wherein the outer end of each fan blade is secured to the inner surface of the fan shroud via a dovetail joint.

7. The system of claim 1, wherein the plurality of fan blades are pre-stressed in a radial direction when the rotor and fan assembly is at rest.

8. The system of claim 7, wherein an inner end of each fan blade has a fan blade base, and further comprising at least one nut positioned between each fan blade base and the fan hub, wherein the at least one nut applies a compressive load in the radial direction to that fan blade.

9. The system of claim 8, wherein each fan blade base has a projecting feature on one side of the fan blade base and a complementary recess on an opposite side of the fan blade base for receiving the projecting feature of an adjacent fan blade base.

10. The system of claim 1, wherein the plurality of rotor magnets are positioned in a Halbach configuration.

11. The system of claim 1, wherein the one or more stator windings comprise polyphase fault tolerant windings.

12. The system of claim 11, wherein the polyphase windings comprise at least three phases.

13. The system of claim 1, further comprising a plurality of guide vanes positioned in the primary air flow path downstream of the electric machine to promote redirection of circumferential air flow resulting from rotation of the rotor and fan assembly relative to the nacelle towards axial air flow.

14. The system of claim 13, wherein the plurality of guide vanes provide structural support for the central support shaft.

15. The system of claim 1, wherein the stator has an inner stator diameter and an axial stator length, and wherein the inner stator diameter is at least 4 times greater than the axial stator length.

16. The system of claim 15, wherein the inner stator diameter is at least 10 times greater than the axial stator length or at least 20 times greater than the axial stator length.

17. The system of claim 1, wherein the stator has an inner diameter, and further comprising a stator enclosure for housing the stator, the stator enclosure comprising:
an annular casing positioned concentrically around the stator, the annular casing having a first end, a second end, an inner surface, and an outer surface, a casing diameter;
a front stator face plate coupled to the first end of the annular casing, the front stator face plate having an inner diameter generally aligned with the inner diameter of the stator; and
a rear stator face plate coupled to the second end of the annular casing, the rear stator face plate having an inner diameter generally aligned with the inner diameter of the stator.

18. The system of claim 17, wherein power electronics for the one or more stator windings are coupled to the annular casing.

19. The system of claim 17, wherein the annular casing and at least one of the front stator face plate and the rear stator face plate are integrally formed.

20. The system of claim 17, wherein a plurality of cooling fins are provided on a front surface of the front stator face plate.

21. The system of claim 17, further comprising a plurality of condensers positioned around the stator enclosure.

22. The system of claim 21, further comprising a plurality of air flow ducts, each of the air flow ducts positioned to direct air into an upstream end of one of the plurality of condensers.

23. The system of claim 21, further comprising heat pipes in thermal communication with the plurality of condensers and with at least one of the one or more stator windings.

24. The system of claim 1, wherein the rotor and fan assembly further comprises a rotor cooling system.

25. The system of claim 24, wherein the rotor cooling system comprises at least one rotor heat pipe in thermal communication with each of the plurality of rotor magnets, each rotor heat pipe being configured to promote oscillatory motion of fluid within that rotor heat pipe in response to a temperature difference between that rotor magnet and ambient air.

26. The system of claim 1, wherein the rotor and fan assembly further comprises a nose cone coupled to the first end of the fan hub.

27. The system of claim 1, further comprising a hub fairing positioned downstream of the rotor and fan assembly.

28. The system of claim 27, further comprising a linear actuator coupled to the hub fairing, wherein the hub fairing may be selectively moved between an extended position in which at least a portion of the hub fairing is positioned in an exit nozzle of the nacelle, and a retracted position in which the hub fairing is proximate the fan hub.

29. An aircraft, comprising:
a nacelle defining a primary air flow path from an inlet end of the nacelle to an outlet end of the nacelle; and
an electric machine comprising:

a stator positioned in the nacelle and comprising one or more stator windings; and a rotor and fan assembly positioned in the primary flow path, the rotor and fan assembly comprising:

a cylindrical fan shroud having a first end, a second end, an inner surface, and an outer surface;

a plurality of rotor magnets directly positioned on the outer surface of the fan shroud and concentric with the one or more stator windings;

a fan hub positioned concentrically interior of the fan shroud, the fan hub having a first end, a second end, an inner surface, an outer surface, and a fan axis of rotation, the fan hub being mounted on a central support shaft via one or more bearings; and a plurality of fan blades extending between the fan shroud and the fan hub.

30. The system of claim 17, wherein the nacelle when in operation substantially restricts air from the primary air flow path from contacting the stator.

\* \* \* \* \*